US012470316B2

(12) United States Patent
Weissman et al.

(10) Patent No.: US 12,470,316 B2
(45) Date of Patent: Nov. 11, 2025

(54) FAST AUTOMATIC GAIN CONTROL IN BYPASS AND FILTER MODES

(71) Applicant: QUALCOMM Incorporated, San Diego, CA (US)

(72) Inventors: Haim Weissman, Haifa (IL); Rakesh Jalota, Hyderabad (IN); Ryan Scott Castro Spring, San Diego, CA (US); Francesco Gatta, San Diego, CA (US); Mehmet Uzunkol, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 649 days.

(21) Appl. No.: 17/935,044

(22) Filed: Sep. 23, 2022

(65) Prior Publication Data

US 2024/0106562 A1    Mar. 28, 2024

(51) Int. Cl.
   *H04B 1/10*      (2006.01)
   *H04K 3/00*      (2006.01)
   *H04W 4/40*      (2018.01)

(52) U.S. Cl.
   CPC ........... *H04K 3/226* (2013.01); *H04B 1/1027* (2013.01); *H04W 4/40* (2018.02)

(58) Field of Classification Search
   CPC ........ H04B 1/1027; H04W 4/40; H04K 3/226
   See application file for complete search history.

(56) References Cited

U.S. PATENT DOCUMENTS

| | | | | |
|---|---|---|---|---|
| 9,191,051 B1* | 11/2015 | Narasimhan | ........ | H04L 1/0637 |
| 10,044,479 B2* | 8/2018 | Wang | ........ | H04L 27/26025 |
| 10,455,503 B2* | 10/2019 | Lee | ........ | H04W 72/23 |
| 10,869,332 B2* | 12/2020 | Negro | ........ | H04L 27/2602 |
| 2004/0142670 A1 | 7/2004 | Ciccarelli | | |
| 2010/0026547 A1 | 2/2010 | Weissman et al. | | |
| 2010/0026549 A1 | 2/2010 | Weissman et al. | | |
| 2013/0237171 A1* | 9/2013 | Lindoff | ........ | H04W 52/0274 455/343.1 |
| 2015/0085687 A1* | 3/2015 | Tabet | ........ | H04W 24/08 370/252 |
| 2015/0234773 A1* | 8/2015 | Sengoku | ........ | G06F 13/4295 710/106 |
| 2015/0280871 A1* | 10/2015 | Xu | ........ | H04L 47/283 370/336 |

(Continued)

OTHER PUBLICATIONS

International Search Report and Written Opinion—PCT/US2023/073882—ISA/EPO—Jan. 1, 2024.

*Primary Examiner* — Dominic E Rego
(74) *Attorney, Agent, or Firm* — Patterson + Sheridan, L.L.P.

(57) ABSTRACT

Methods and apparatus for performing automatic gain control (AGC) in bypass and filter modes for radio frequency (RF) front-end circuitry are described. An example method includes operating a receiver in a first mode during a first set of symbols of a first subframe. The method also includes, during a first symbol of the first subframe outside the first set of symbols, determining whether to operate the receiver in the first mode or a second mode in a second subframe, based at least in part on an output of a jamming detection circuit of the receiver in the first symbol. The method also includes controlling the receiver to operate in the first mode or the second mode in the second subframe, in accordance with the determination.

30 Claims, 26 Drawing Sheets

(56) References Cited

U.S. PATENT DOCUMENTS

| | | | |
|---|---|---|---|
| 2018/0234276 A1* | 8/2018 | Parkvall | H04L 5/003 |
| 2019/0103953 A1* | 4/2019 | Liao | H04W 72/23 |
| 2021/0050934 A1* | 2/2021 | Khoshnevisan | H04L 1/0067 |
| 2021/0143869 A1* | 5/2021 | Khoshnevisan | H04W 72/0446 |
| 2021/0282170 A1* | 9/2021 | Falconetti | H04L 5/0048 |
| 2022/0022216 A1* | 1/2022 | Li | H04L 27/2602 |

* cited by examiner

1300

SWP = -18dBFs - in Bypassed mode; FE-IL = 2dB

|  | Rx gain state Swpt | | | |
|---|---|---|---|---|
|  | Rising | Nominal | Falling | Hysteresis |
| G0<->G1 |  | -60.5 |  | 4 |
| G1<->G2 |  | -48.5 |  | 4 |
| G2<->G3 |  | -41.7 |  | 0 |
| G3<->G4 |  | -38.7 |  | 0 |
| G4<->G5 |  | -35.7 |  | 0 |
| G5<->G6 |  | -32.7 |  | 0 |
| G6<->G7 |  | -29.7 |  | 4 |
| G7<->G8 |  | -26.7 |  | 0 |
| G8<->G9 |  | -23.7 |  | 0 |
| G9<->G10 |  | -20.7 |  | 0 |
| G10<->G11 |  | -17.7 |  | 0 |
| G11 |  | -14.7 |  | 0 |

-64.5dBm
↕16dB
-48.5dBm

16dB
-32.5dBm

G1

|  | PWR | >= | -32.5dBm | G10 |
| -48.5dBm =< | PWR | <= | -30.7dBm | G2:G5 |
| -60.5dBm =< | PWR | <= | -48.5dBm | G1 |
|  | PWR | <= | -60.5dBm | G0 |

FIG. 13

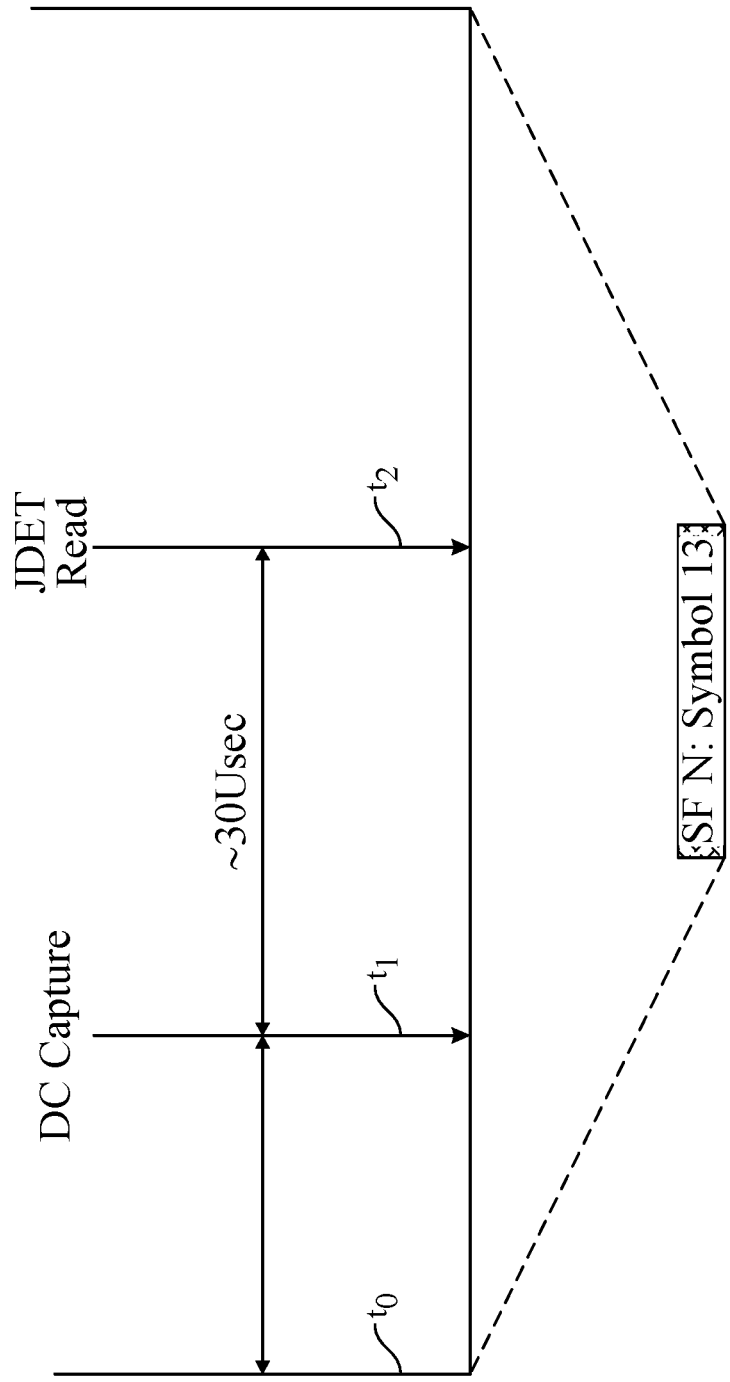

FAST AUTOMATIC GAIN CONTROL IN BYPASS AND FILTER MODES

TECHNICAL FIELD

Certain aspects of the present disclosure generally relate to electronic circuits and, more particularly, to techniques and apparatus for performing automatic gain control (AGC) in wireless receiver front-end circuitry.

BACKGROUND

Wireless communication devices are widely deployed to provide various communication services such as telephony, video, data, messaging, broadcasts, and so on. Such wireless communication devices may transmit and/or receive radio frequency (RF) signals via any of various suitable radio access technologies (RATs) including, but not limited to, 5G New Radio (NR), Long Term Evolution (LTE), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., WiFi), and the like.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include radio frequency (RF) front-end circuitry, which may be used for communication within a millimeter wave (mmW) communication band, for example.

Wireless communication systems have been applied to enable wireless communication services in vehicles. For example, one type of wireless communication, referred to as cellular vehicle-to-everything (C-V2X) communication, provides communication of information from a vehicle to any entity and vice versa over a cellular link. Vehicles that support C-V2X communication may be referred to as C-V2X-enabled vehicles or C-V2X vehicles. A C-V2X vehicle is able to share information about itself, such as its presence, location, direction, speed, etc. with other C-V2X vehicles. Such communications between C-V2X vehicles increases safety and efficiency by allowing the C-V2X vehicles to coordinate and plan driving paths along roadways. However, there exists a need for further improvements in C-V2X wireless communication systems to overcome various challenges.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved sensitivity of a receiver with minimal impact on the receiver performance in the presence of jamming signals.

One aspect provides a method for wireless communication. The method includes operating a receiver in a first mode during a first set of symbols of a first subframe. The method also includes, during a first symbol of the first subframe outside the first set of symbols, determining whether to operate the receiver in the first mode or a second mode in a second subframe, based at least in part on an output of a jamming detection circuit of the receiver in the first symbol. The method further includes controlling the receiver to operate in the first mode or the second mode in the second subframe, in accordance with the determination.

Another aspect provides a wireless device. The wireless device includes a receiver, at least one processor coupled to the receiver, and a memory coupled to the at least one processor. The receiver includes a jamming detection circuit. The memory stores computer-executable instructions, which, when executed by the at least one processor, performs an operation. The operation includes operating the receiver in a first mode during a first set of symbols of a first subframe. The operation also includes, during a first symbol of the first subframe outside the first set of symbols, determining whether to operate the receiver in the first mode or a second mode in a second subframe, based at least in part on an output of the jamming detection circuit in the first symbol. The operation further includes controlling the receiver to operate in the first mode or the second mode in the second subframe, in accordance with the determination.

Another aspect includes an apparatus. The apparatus includes means for receiving a signal in a first mode during a first set of symbols of a first subframe. The apparatus also includes means for detecting a presence of a jamming signal during a first symbol of the first subframe outside the first set of symbols. The apparatus further includes means for determining whether to operate the means for receiving in the first mode or a second mode in a second subframe, based at least in part on an output of the means for detecting in the first symbol. The apparatus further includes means for controlling the means for receiving to operate in the first mode or the second mode in the second subframe, in accordance with the determination.

Other aspects provide: a non-transitory, computer-readable media comprising instructions that, when executed by a processor of an apparatus, cause the apparatus to perform the aforementioned methods as well as those described elsewhere herein; and/or a computer program product embodied on a computer-readable storage medium comprising code for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 13 illustrates another a table of switch points for multiple gain states of a receiver, in accordance with some aspects of the present disclosure.

FIG. 15C illustrates an example symbol subsequent to the symbol depicted in FIG. 15B, according to certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
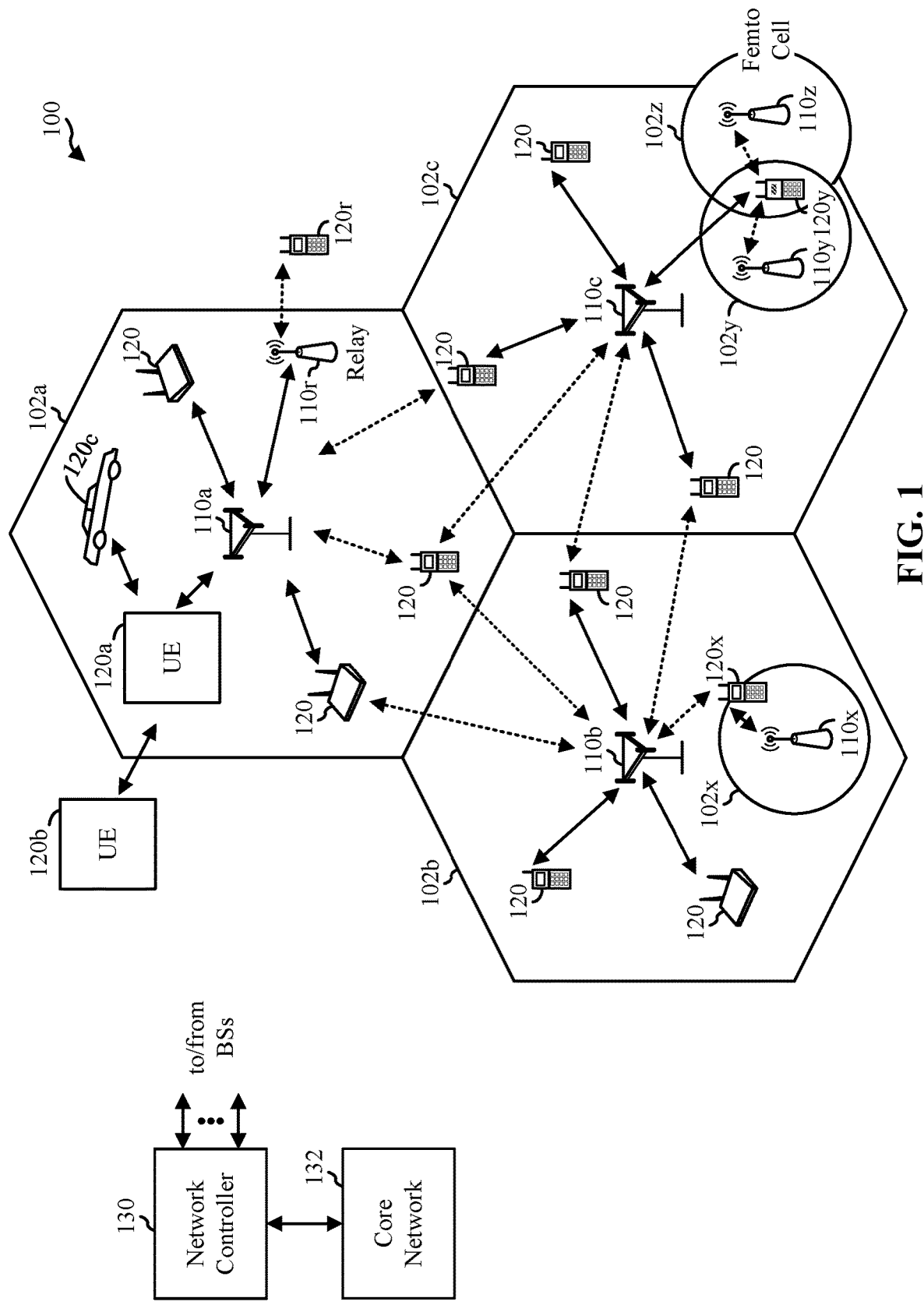
FIG. 1 is a diagram of an example wireless communications network, in which aspects of the present disclosure may be practiced.

Certain aspects of the present disclosure relate to techniques and apparatus for performing fast automatic gain control (AGC) in multiple operating modes (e.g., bypass and filter modes) for wireless receiver front-end circuitry. The techniques described herein can improve the sensitivity of wireless receivers during wireless communications, including, for example, cellular vehicle-to-everything (C-V2X) communications.

For example, certain conventional wireless receivers (e.g., conventional C-V2X receivers) typically include a bandpass filter (BPF) (prior to the low noise amplifier (LNA)) in the receive (RX) path of the receiver circuitry (which may be part of transceiver radio frequency (RF) front-end circuitry). The BPF may be used to protect the RX operations of the wireless receiver in the presence of jamming signals. For example, there may be strong out-of-band (OOB) jamming signals from wireless transmitters, and the BPF may be used to reject the OOB jamming signals. One issue with using a BPF in conventional wireless receivers is that, when jamming signals are not present or do not impact the RX operations of the wireless receiver, the BPF may degrade the noise figure and, in turn, cause unnecessary desensing of the RX operations.

To address this, certain aspects described herein provide techniques for operating a wireless receiver (e.g., C-V2X receiver) with different operating modes in the RX path, based on whether the wireless receiver is in the presence of jamming signals. The different operating modes can include a filter mode and a bypass mode. The filter mode may be used to protect the RX path of the wireless receiver in the presence of one or more jamming signals. For example, the wireless receiver may include a filter (e.g., BPF) and an amplifier (e.g., LNA) in the RX RF front-end circuitry, where the filter is located prior to the amplifier. When the wireless receiver is operating with the filter mode in the RX path, the wireless receiver may use the filter to reject one or more jamming signals that are detected.

On the other hand, the bypass mode may be used to improve the sensitivity of the RX path when the wireless receiver is not in the presence of jamming signals. For example, when the wireless receiver is operating with the bypass mode in the RX path, the wireless receiver may allow a reception signal to bypass the filter (e.g., BPF) in the RX RF front-end circuitry when jamming signals are not present (e.g., have not been detected), so that the RX path of the wireless receiver is minimally impacted by the degradation of the noise figure caused by the filter.

In certain aspects, the wireless receiver may use the filter mode in the RX path as a default mode in order to provide protection from OOB jammers. For example, the wireless receiver may operate with the filter mode in the RX path during a set of symbols of a subframe, and may check for the presence of OOB jammers in another symbol of the subframe outside of the set of symbols. This other symbol of the subframe may be silence mode for (in-band) wireless transmitters. For example, assuming the wireless receiver is part of a C-V2X transceiver, no active C-V2X signals should be transmitted during this other symbol of the subframe. In certain aspects, the wireless receiver may determine whether to switch to operating with the bypass mode in the RX path during a subsequent subframe, based at least in part on a number of times that an OOB jammer has not been detected in this other symbol of the subframe.

In this manner, aspects described herein can significantly improve the performance of wireless receivers (relative to conventional techniques) by enabling a wireless receiver to (i) use an operating mode in the RX path that provides an improved RX noise figure when the wireless receiver is not in the presence of jamming signals and (ii) use an operating mode in the RX path that provides protection from jamming signals when the wireless receiver is in the presence of jamming signals.

Note that, as used herein, the term "wireless receiver" may refer to the RX operations of a wireless transceiver, RX chain of a wireless transceiver, or RX path of a wireless transceiver. Accordingly, the terms "wireless receiver," "RX operations of a wireless transceiver," "RX path of a wireless transceiver," "RX chain of a wireless transceiver" may be used interchangeably.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Wireless System

FIG. 1 illustrates an example wireless communications network 100, in which aspects of the present disclosure may be practiced. The wireless communications network 100 may be a C-V2X communication system, a New Radio (NR) system (e.g., a Fifth Generation (5G) NR network), an Evolved Universal Terrestrial Radio Access (E-UTRA) system (e.g., a Fourth Generation (4G) network), a Universal Mobile Telecommunications System (UMTS) (e.g., a Second Generation/Third Generation (2G/3G) network), or a code division multiple access (CDMA) system (e.g., a 2G/3G network), or may be configured for communications according to an IEEE standard such as one or more of the 802.11 standards, etc.

As illustrated in FIG. 1, the wireless communications network 100 may include a number of base stations (BSs) 110a-z (each also individually referred to herein as "BS 110" or collectively as "BSs 110") and other network entities. A BS may also be referred to as an access point (AP), an evolved Node B (eNodeB or eNB), a next generation Node B (gNodeB or gNB), or some other terminology.

A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communications network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with one or more user equipments (UEs) 120a-y (each also individually referred to herein as "UE 120" or collectively as "UEs 120") in the wireless communications network 100. A UE may be fixed or mobile and may also be referred to as a user terminal (UT), a mobile station (MS), an access terminal, a station (STA), a client, a wireless device, a mobile device, or some other terminology. A user terminal may be a wireless device, such as a cellular phone, a smartphone, a personal digital assistant (PDA), a handheld device, a wearable device, a wireless modem, a laptop computer, a tablet, a personal computer, a vehicle (e.g., car, truck, motorcycle, boat, or any other means of transportation), etc.

The BSs 110 are considered transmitting entities for the downlink and receiving entities for the uplink. The UEs 120 are considered transmitting entities for the uplink and receiving entities for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink. $N_{up}$ UEs may be selected for simultaneous transmission on the uplink, $N_{dn}$ UEs may be selected for simultaneous transmission on the downlink. $N_{up}$ may or may not be equal to $N_{dn}$, and $N_{up}$ and $N_{dn}$ may be static values or can change for each scheduling interval. Beam-steering or some other spatial processing technique may be used at the BSs 110 and/or UEs 120.

The UEs 120 (e.g., 120x, 120y, etc.) may be dispersed throughout the wireless communications network 100, and each UE 120 may be stationary or mobile. The wireless communications network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120, to facilitate communication between devices. Further, in some aspects, the wireless communications network 100 may include UEs (e.g., UEs 120*a*, 120*b*, 120*c*) that communicate directly with each other via sidelinks according to a C-V2X standard, as described in more detail below.

The BSs 110 may communicate with one or more UEs 120 at any given moment on the downlink and uplink. The downlink (i.e., forward link) is the communication link from the BSs 110 to the UEs 120, and the uplink (i.e., reverse link) is the communication link from the UEs 120 to the BSs 110. A UE 120 may also communicate peer-to-peer with another UE 120.

The wireless communications network 100 may use multiple transmit and multiple receive antennas for data transmission on the downlink and uplink. BSs 110 may be equipped with a number Nap of antennas to achieve transmit diversity for downlink transmissions and/or receive diversity for uplink transmissions. A set Nu of UEs 120 may receive downlink transmissions and transmit uplink transmissions. Each UE 120 may transmit user-specific data to and/or receive user-specific data from the BSs 110. In general, each UE 120 may be equipped with one or multiple antennas. The Nu UEs 120 can have the same or different numbers of antennas.

The wireless communications network 100 may be a time division duplex (TDD) system or a frequency division duplex (FDD) system. For a TDD system, the downlink and uplink share the same frequency band. For an FDD system, the downlink and uplink use different frequency bands. The wireless communications network 100 may also utilize a single carrier or multiple carriers for transmission. Each UE 120 may be equipped with a single antenna (e.g., to keep costs down) or multiple antennas (e.g., where the additional cost can be supported).

A network controller 130 (also sometimes referred to as a "system controller") may be in communication with a set of BSs 110 and provide coordination and control for these BSs 110 (e.g., via a backhaul). In certain cases (e.g., in a 5G NR system), the network controller 130 may include a centralized unit (CU) and/or a distributed unit (DU). In certain aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In certain aspects of the present disclosure, the BSs 110 and/or the UEs 120 may include RF front-end circuitry that supports multiple operating modes in the RX path, including, for example, a filter mode and a bypass mode.

Figure 2:
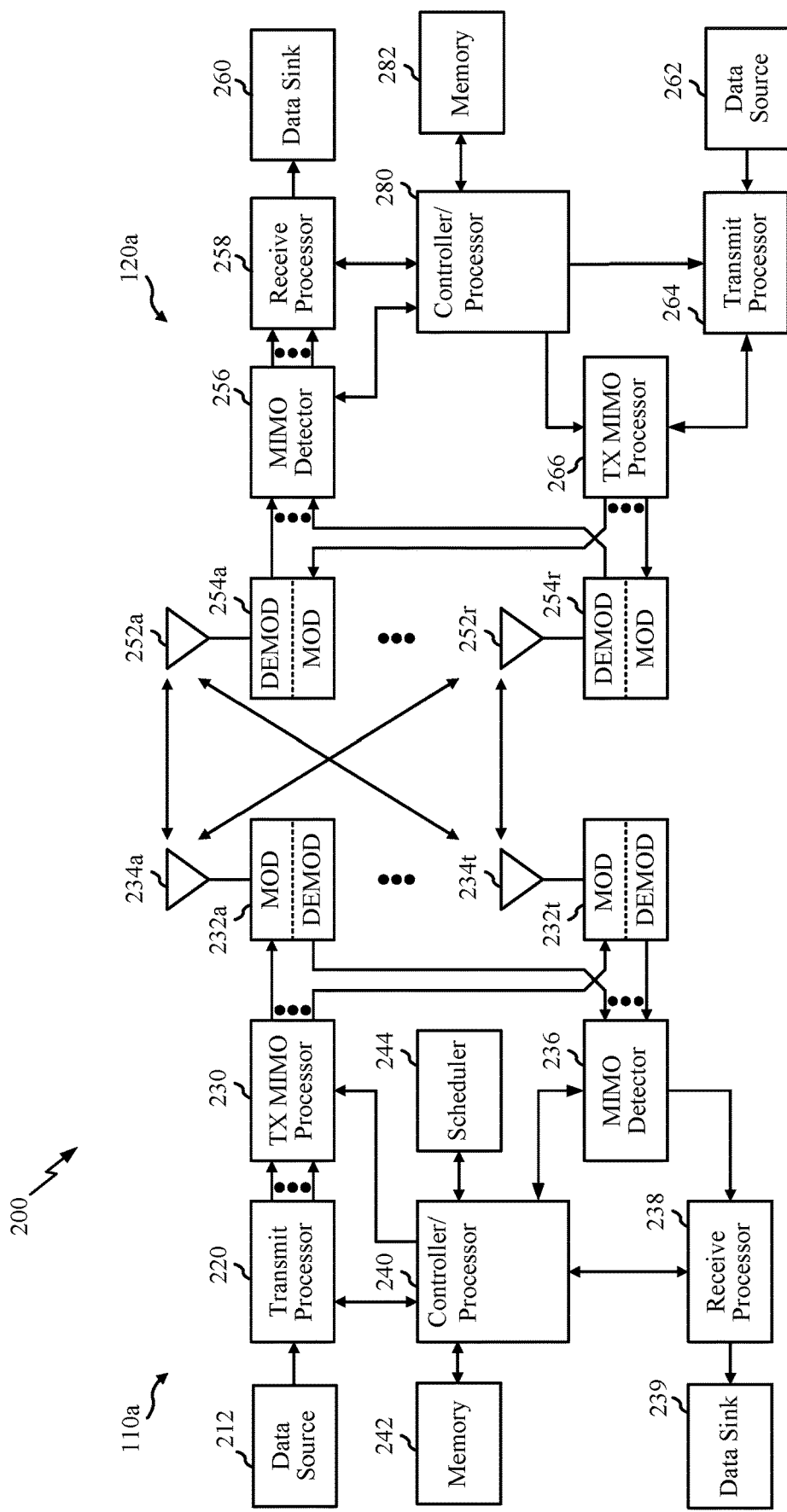
FIG. 2 is a block diagram conceptually illustrating a design of an example base station (BS) and user equipment (UE), in which aspects of the present disclosure may be practiced.

FIG. 2 illustrates example components of BS 110*a* and UE 120*a* (e.g., from the wireless communications network 100 of FIG. 1), in which aspects of the present disclosure may be implemented.

On the downlink, at the BS 110*a*, a transmit processor 220 may receive data from a data source 212, control information from a controller/processor 240, and/or possibly other data (e.g., from a scheduler 244). The various types of data may be sent on different transport channels. For example, the control information may be designated for the physical broadcast channel (PBCH), physical control format indicator channel (PCFICH), physical hybrid automatic repeat request (HARM) indicator channel (PHICH), physical downlink control channel (PDCCH), group common PDCCH (GC PDCCH), etc. The data may be designated for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS).

A transmit (TX) multiple-input, multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for orthogonal frequency division multiplexing (OFDM), etc.) to obtain an output sample stream. Each of the transceivers 232*a*-232*t* may further process (e.g., convert to analog, amplify, filter, and upconvert) the output sample stream to obtain a downlink signal. Downlink signals from the transceivers 232*a*-232*t* may be transmitted via the antennas 234*a*-234*t*, respectively.

At the UE 120*a*, the antennas 252*a*-252*r* may receive the downlink signals from the BS 110*a* and may provide received signals to the transceivers 254*a*-254*r*, respectively. The transceivers 254*a*-254*r* may condition (e.g., filter, amplify, downconvert, and digitize) a respective received signal to obtain input samples. Each demodulator (DEMOD) in the transceivers 232*a*-232*t* may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280. In certain aspects, the UE 120*a* may include RF front-end circuitry that may support multiple operating modes in the RX path, including, for example, a filter mode and a bypass mode.

On the uplink, at UE 120*a*, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., the sounding reference signal (SRS)). The symbols from the transmit processor 264 may be precoded by a TX MIMO processor 266 if applicable, further processed by the modulators (MODs) in transceivers 254*a*-254*r* (e.g., for single-carrier frequency division multiplexing (SC-FDM), etc.), and transmitted to the BS 110*a*. At the BS 110*a*, the uplink signals from the UE 120*a* may be received by the antennas 234, processed by the demodulators in transceivers 232*a*-232*t*, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110a and UE 120a, respectively. The memories 242 and 282 may also interface with the controllers/processors 240 and 280, respectively. A scheduler 244 may schedule UEs for data transmission on the downlink and/or uplink.

Antennas 252, processors 258, 264, 266, and/or controller/processor 280 of the UE 120a and/or antennas 234, processors 220, 230, 238, and/or controller/processor 240 of the BS 110a may be used to perform the various techniques and methods described herein.

Example Transceiver Front-End

Figure 3:
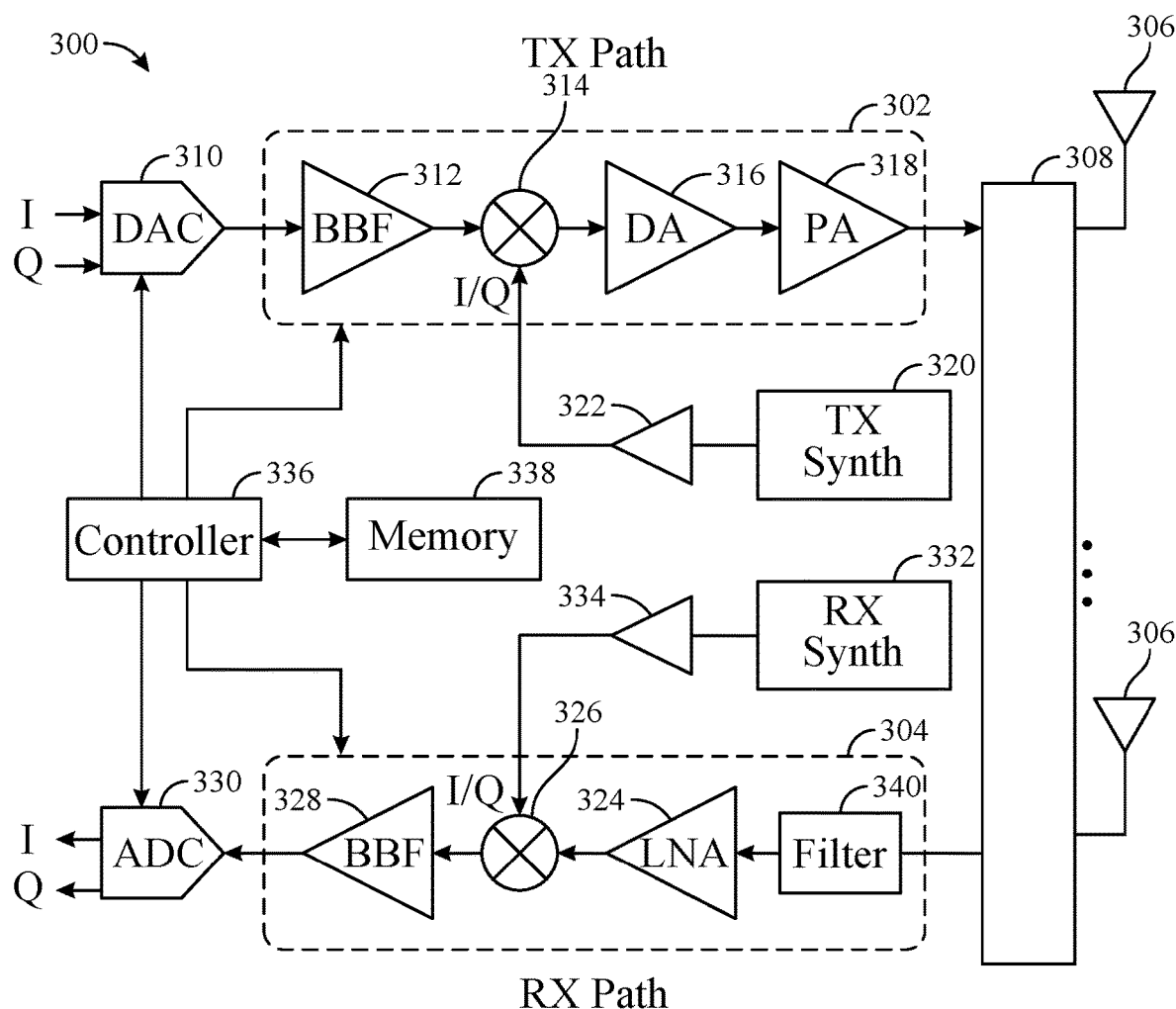
FIG. 3 is a block diagram of an example transceiver front-end, in which aspects of the present disclosure may be practiced.

FIG. 3 is a block diagram of an example transceiver front-end 300 (also referred to as a transceiver circuit), according to certain aspects of the present disclosure. The transceiver front-end 300 includes at least one transmit (TX) path 302 (also known as a "transmit (TX) chain" or "transmit (TX) operations") for transmitting signals via one or more antennas 306 and at least one receive (RX) path 304 (also known as a "receive (RX) chain" or "receive (RX) operations") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like. Note that although a single RX path and a single TX path are depicted in FIG. 3, the transceiver front-end 300 can include multiple RX paths and/or multiple TX paths, which can be connected to one or more antennas 306.

Receiving in-phase (I) and/or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, the DA 316, and the PA 318 may be included in a radio frequency integrated circuit (RFIC). For certain aspects, the PA 318 may be external to the RFIC.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency-conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna(s) 306. While one mixer 314 is illustrated, several mixers may be used to upconvert the filtered baseband signals to one or more intermediate frequencies and to thereafter upconvert the intermediate frequency (IF) signals to a frequency for transmission.

The RX path 304 may include a filter 340, a low noise amplifier (LNA) 324, a mixer 326, and a baseband filter (BBF) 328. The filter 340 may be a passive filter, such as a BPF, for example. The filter 340, LNA 324, the mixer 326, and the BBF 328 may be included in one or more RFICs, which may or may not be the same RFIC that includes the TX path components. RF signals received via the antenna(s) 306 may be filtered by the filter 340 and amplified by the LNA 324. The mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I and/or Q signals for digital signal processing.

Certain transceivers (e.g., C-V2X transceivers) may use the filter 340 to provide protection from OOB jammers. For example, the filter 340 may be used to reject OOB jamming signals that may cause desensing of the RX path 304. However, in scenarios where OOB jamming signals are not present, the filter 340 may degrade the noise figure (NF) of the RX path 304 and, in turn, cause unnecessary desensing of the RX operations.

Certain transceivers may employ frequency synthesizers with a variable-frequency oscillator (e.g., a voltage-controlled oscillator (VCO) or a digitally controlled oscillator (DCO)) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326. For certain aspects, a single frequency synthesizer may be used for both the TX path 302 and the RX path 304. In certain aspects, the TX frequency synthesizer 320 and/or RX frequency synthesizer 332 may include a frequency multiplier, such as a frequency doubler, that is driven by an oscillator (e.g., a VCO) in the frequency synthesizer.

A controller 336 (e.g., controller/processor 280 in FIG. 2) may direct the operation of the transceiver front-end 300, such as transmitting signals via the TX path 302 and/or receiving signals via the RX path 304. The controller 336 may be a processor, a digital signal processor (DSP), an application-specific integrated circuit (ASIC), a field-programmable gate array (FPGA) or other programmable logic device (PLD), discrete gate or transistor logic, discrete hardware components, or any combination thereof. A memory 338 (e.g., memory 282 in FIG. 2) may store data and/or program codes for operating the transceiver front-end 300. The controller 336 and/or the memory 338 may include control logic (e.g., complementary metal-oxide-semiconductor (CMOS) logic).

Example C-V2X Systems

Figure 4A:
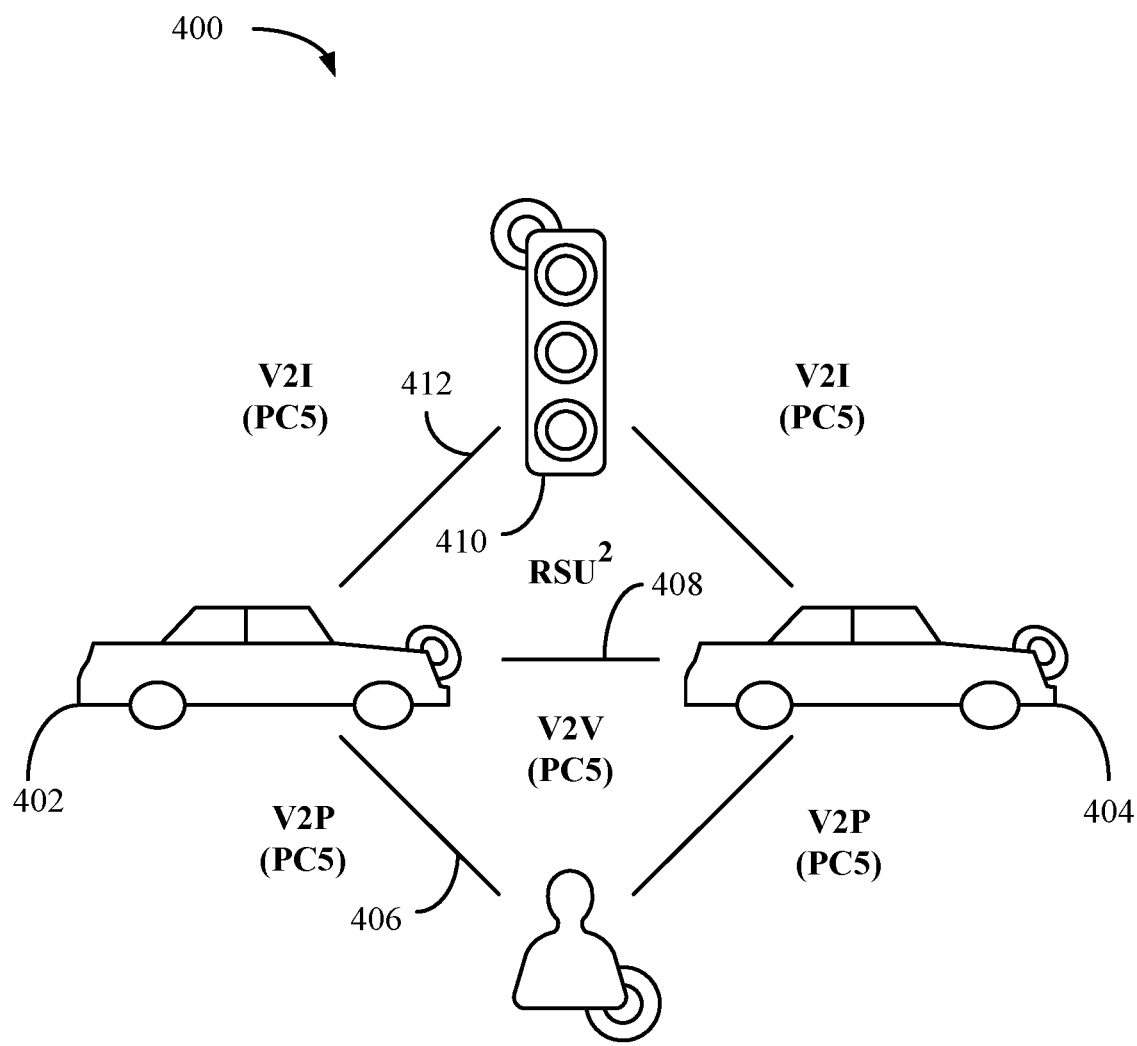
FIGS. 4A and 4B depict diagrammatic representations of example C-V2X systems, in accordance with some aspects of the present disclosure.
Figure 4B:
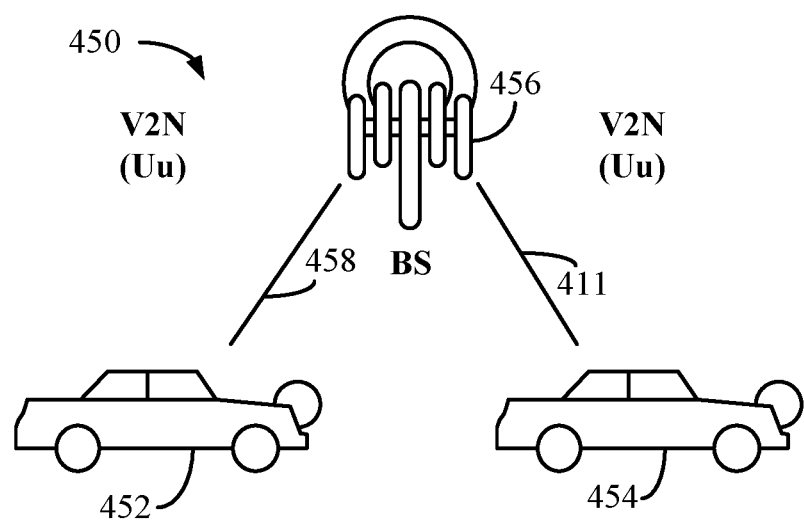

C-V2X may include vehicle-to-vehicle (V2V), vehicle-to-pedestrian (V2P), vehicle-to-infrastructure (V21), vehicle-to-network (V2N), and combinations thereof. FIG. 4A and FIG. 4B depict diagrammatic representations of example C-V2X systems, in accordance with some aspects of the present disclosure.

The C-V2X systems that are shown in FIG. 4A and FIG. 4B provide two complementary transmission modes. A first transmission mode, shown by way of example in FIG. 4A, may involve direct communications (may also be referred to as sidelink communications) between participants in proximity to one another in a local area. Sidelink transmissions by the UEs (e.g., Vehicles 402 and 404, road side unit (RSU) (e.g., traffic light 410)) may be implemented over a PC5 interface (e.g., a wireless communication interface between a first UE and a second UE). A second transmission mode, shown by way of example in FIG. 4B, may involve network communications through a network, which may be implemented over a Uu interface (e.g., a wireless communication interface between a radio access network (RAN) and a UE).

Referring to FIG. 4A, a C-V2X system 400 (e.g., V2V communications, also referred to as C-V2X Mode 4) is illustrated with two vehicles 402, 404. The first transmission mode allows for direct communication between different participants in a given geographic location. As illustrated, a vehicle can have a wireless communication link 406 with an individual (V2P) (e.g., with a mobile phone of the individual) through a PC5 interface. Communications between the vehicles 402 and 404 may also occur through a PC5 interface 408. In a like manner, communication may occur from a vehicle 402 to other highway components, such as a traffic signal (e.g., traffic light 410) or sign (V21) through a PC5 interface 412. With respect to each communication link illustrated in FIG. 4A, two-way communication may take place between elements, therefore each element may be a transmitter and a receiver of information.

The V2X system 400 may be a self-managed system implemented without assistance from a network entity. A self-managed system may enable improved spectral efficiency, reduced cost, and increased reliability as network service interruptions do not occur during handover operations for moving vehicles. The V2X system 400 may be configured to operate in a licensed and/or unlicensed spectrum, thus any vehicle with an equipped system may access a common frequency and share information. Such harmonized/common spectrum operations may allow for safe and reliable operations.

FIG. 4B shows a V2X system 450 for communication between a vehicle 452 and a vehicle 454 through a network entity 456. These network communications may occur through discrete nodes, such as a BS (e.g., the BS 110a shown in FIG. 1), that sends and receives information to and from (or relays information between) vehicles 452, 454. The network communications through V2N links 458 and 411 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

As noted, some V2X systems may be self-managed systems implemented without assistance from a network entity. C-V2X Mode-4 (also known as V2V), for example, may operate without infrastructure support and may use a specific resource pool configuration and semi-persistent scheduling (SPS) to select and reserve resources for transmission. In V2V, sidelink control information may be transmitted over the physical sidelink control channel (PSCCH), and data may be transmitted over the physical sidelink shared channel (PSSCH). The sidelink control information may carry information related to the transmission of data over the PSSCH.

Figure 5:
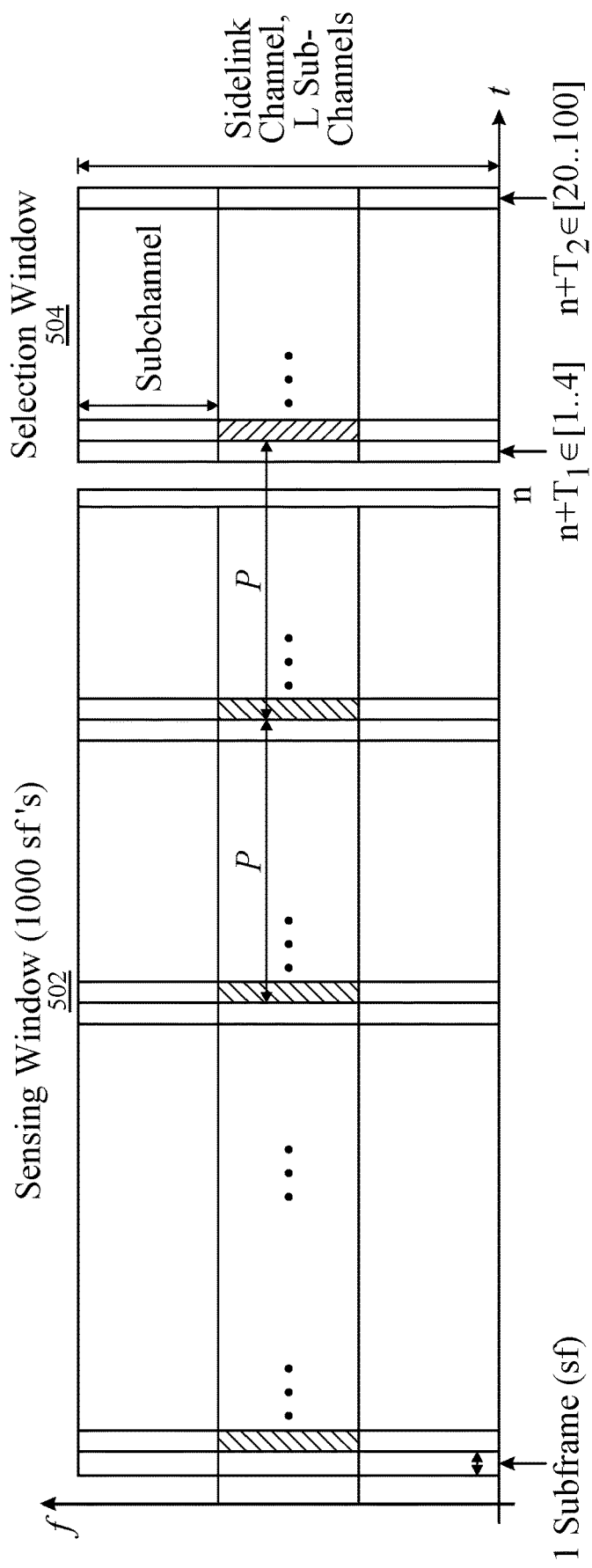
FIG. 5 illustrates an example of sensing and selection windows for semi-persistent scheduling in a C-V2X system, in accordance with some aspects of the present disclosure.

C-V2X Mode-4 uses sensing to determine suitable SPS transmission opportunities (e.g., the set of subframes and subchannels for transmission). An example of sensing and selection windows for SPS in C-V2X is illustrated in FIG. 5. As shown, the sensing window 502 may span a number of subframes (e.g., 1000 subframes as depicted in FIG. 5). Within the sensing window 502, a UE may select a set of candidate single-subframe resources (e.g., L sub-channels) within a selection window 504. The selection window 504 may span a number of subframes and contain M single-subframe resources. As shown in FIG. 5, the parameters $T_1$ and $T_2$ may define the selection window 504. The selection window 504 may occur every P subframes.

Example Fast Automatic Gain Control for C-V2X Transceiver Front-End

A C-V2X transceiver (e.g., transceiver front-end 300) may transmit at a low duty cycle (e.g., ~2%). For example, a C-V2X transceiver may transmit once per 100 milliseconds (ms), 200 ms, or 300 ms. The C-V2X transmit signal(s) may be transmitted in a burst mode by each UE. Similarly, when receiving C-V2X signals, the C-V2X transceiver may also operate with a burst mode in the RX path, on a subframe-by-subframe basis. The C-V2X transceiver may operate without continuous loops in the RX path.

Relative to certain signals (e.g. LTE signals), a C-V2X signal may vary randomly from one subframe to another subframe with different frequency allocations and received signal power for each subframe. In some cases, "fast" AGC logic may be used to adjust the gain at the beginning of each subframe in less than one symbol time.

Figure 6:
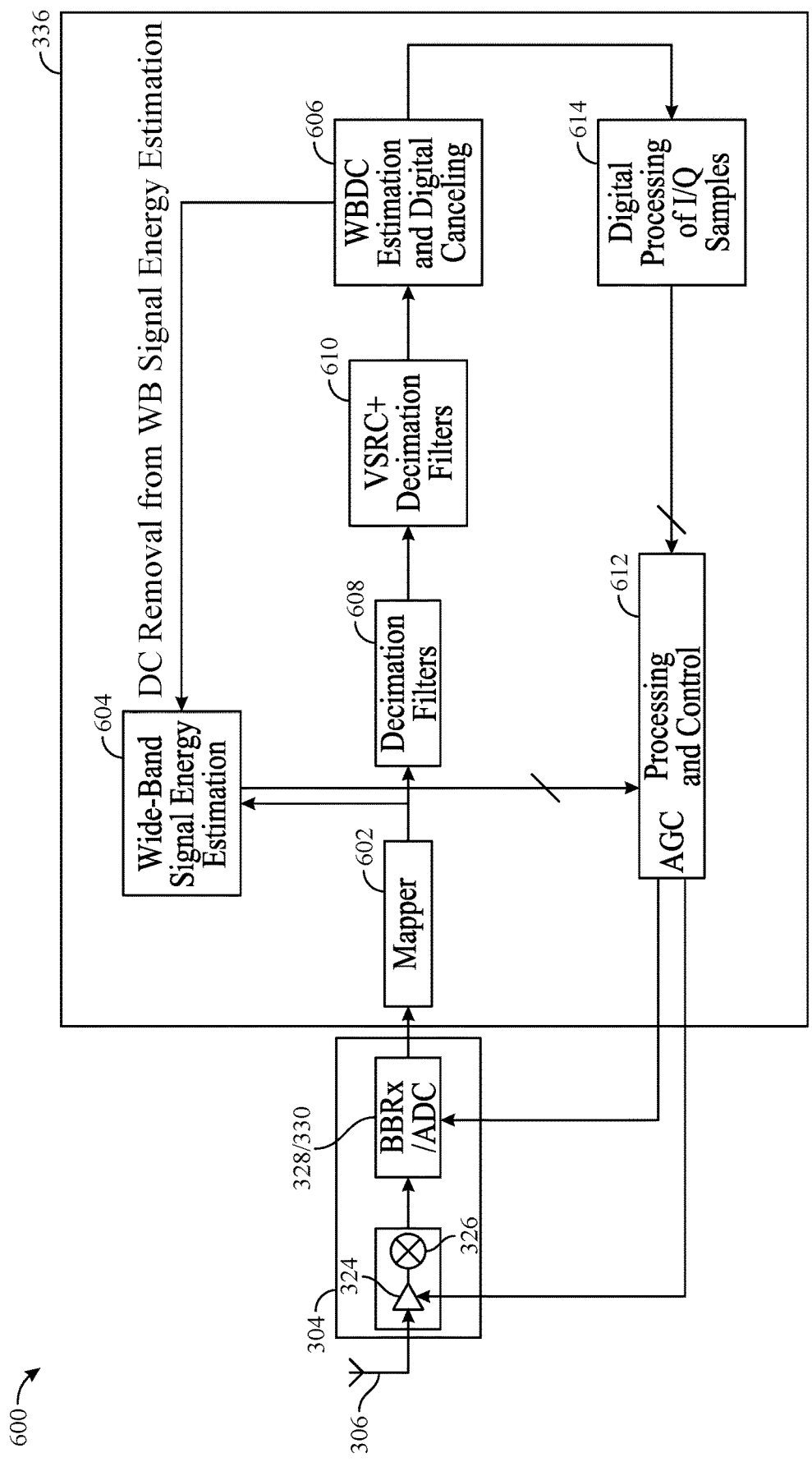
FIG. 6 illustrates an example automatic gain control (AGC) scheme for a wireless receive (RX) path, in accordance with some aspects of the present disclosure.

FIG. 6 illustrates an example AGC scheme 600 for a wireless RX path (e.g., RX path 304), according to certain aspects of the present disclosure. The AGC scheme 600 may be used to implement "fast" AGC in which the gain is adjusted at the beginning of each subframe in less than one symbol time. As shown, the controller 336 includes a mapper component 602, a wide-band energy estimation (WBEE) component 604, a wide-band signal direct current estimation (WBDC) component 606, a decimation filter component 608, a decimation filter component 610, AGC logic 612, and a digital processing component 614.

In the AGC scheme 600, the ADC 330 may output digital signals (e.g., digital I and/or Q signals) for digital signal processing by the controller 336. For example, the controller 336 may demap the digital signal (via mapper component 602), downsample the digital signal (via decimation filter components 608 and 610), and further process (e.g., decode) the digital signal (via digital processing component 614). In certain aspects, the controller 336 may use the WBEE component 604 to estimate the wide-band signal energy of the digital signal, and use the WBDC component 606 to estimate the wide-band DC offset of the digital signal. The controller 336 may use the AGC logic 612 to adjust the gain of the RF chain (e.g., LNA 324, mixer 326) and the gain of the baseband chain (e.g., BBF 328, ADC 330).

The AGC logic 612 may start with an initial gain and may select the final gain to converge to, based on the WBEE of the digital signal (determined by via the WBEE component 604). In some aspects, the DC offset generated at the receiver mixer output from the WBEE of the digital signal. For example, the DC-offset estimation and cancellation may be provided by the WBDC component 606. DC-offset estimation and cancellation for the active receiver AGC gains may impact the decisions of the AGC logic 612, the RX path sensitivity and signal-to-noise ratio (SNR).

Figure 7:
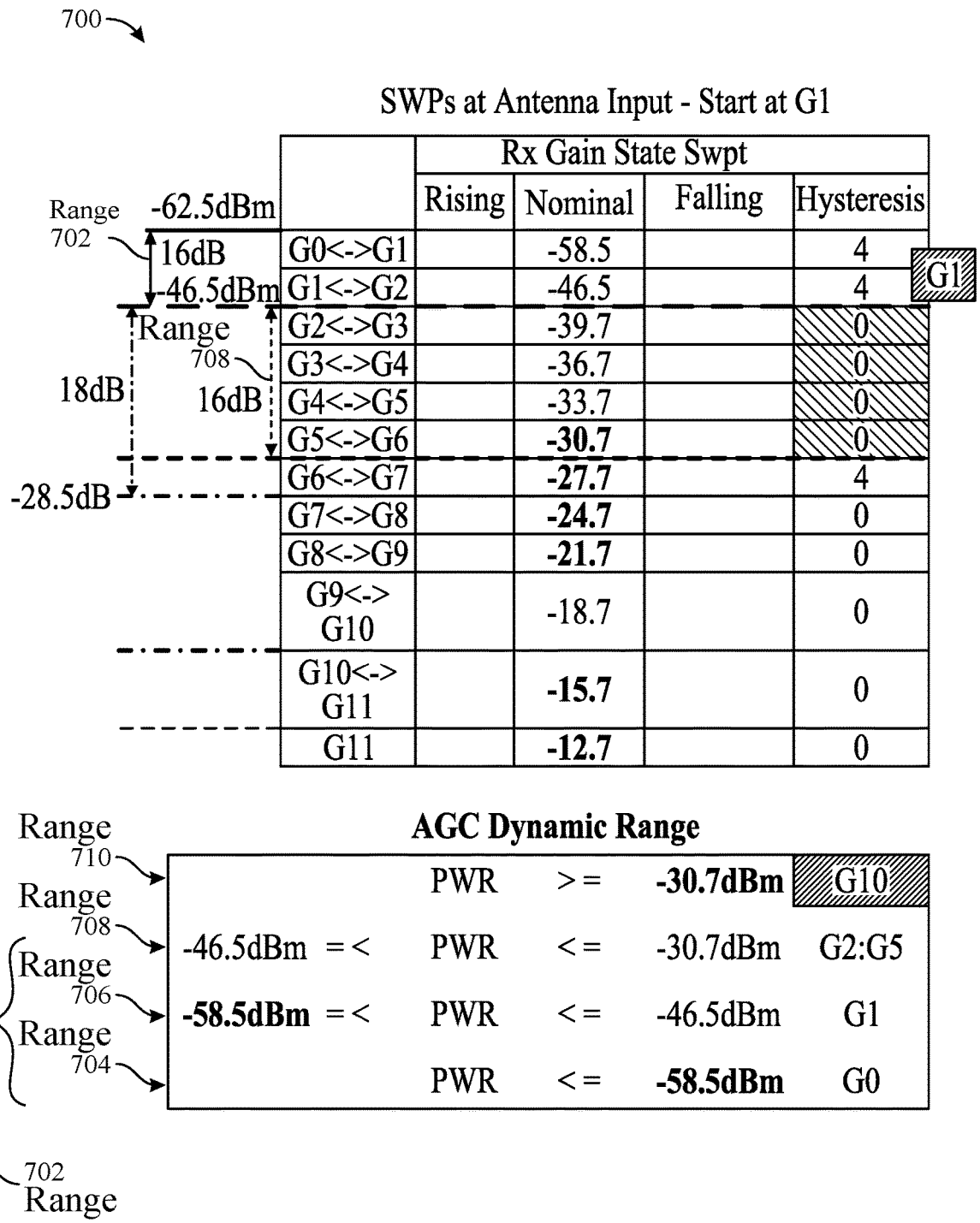
FIG. 7 illustrates a table of switch points for multiple gain states of a receiver, in accordance with some aspects of the present disclosure.

In some aspects, the AGC logic 612 may adjust the gain(s) in one step in order to allow a fast settling time in less than one symbol time (e.g., ~less than 30 microseconds (us)). In some aspects, the AGC logic 612 may adjust the gain(s) in more than one step (e.g., two steps). FIG. 7 illustrates a table 700 of switch points for multiple gain states (GSs) at the RX antenna input of the receiver, according to certain aspects of the present disclosure. The switch points in table 700 are based on 12 GSs (e.g., G0 through G11), which may be used for performing "fast" AGC for the RX path of the receiver. For example, the AGC logic 612 may select a gain state from the 12 gain states for the cascade RF+BB gain of the AGC scheme 600 depicted in FIG. 6. Each gain state G0 through G11 may have its backoff (BO) referred to the ADC full scale (FS), taking into account the signal peak-to-averagepower ratio (PAPR) and fading. In the example depicted in table 700, each gain state has an 18 dB BO.

Figure 8:
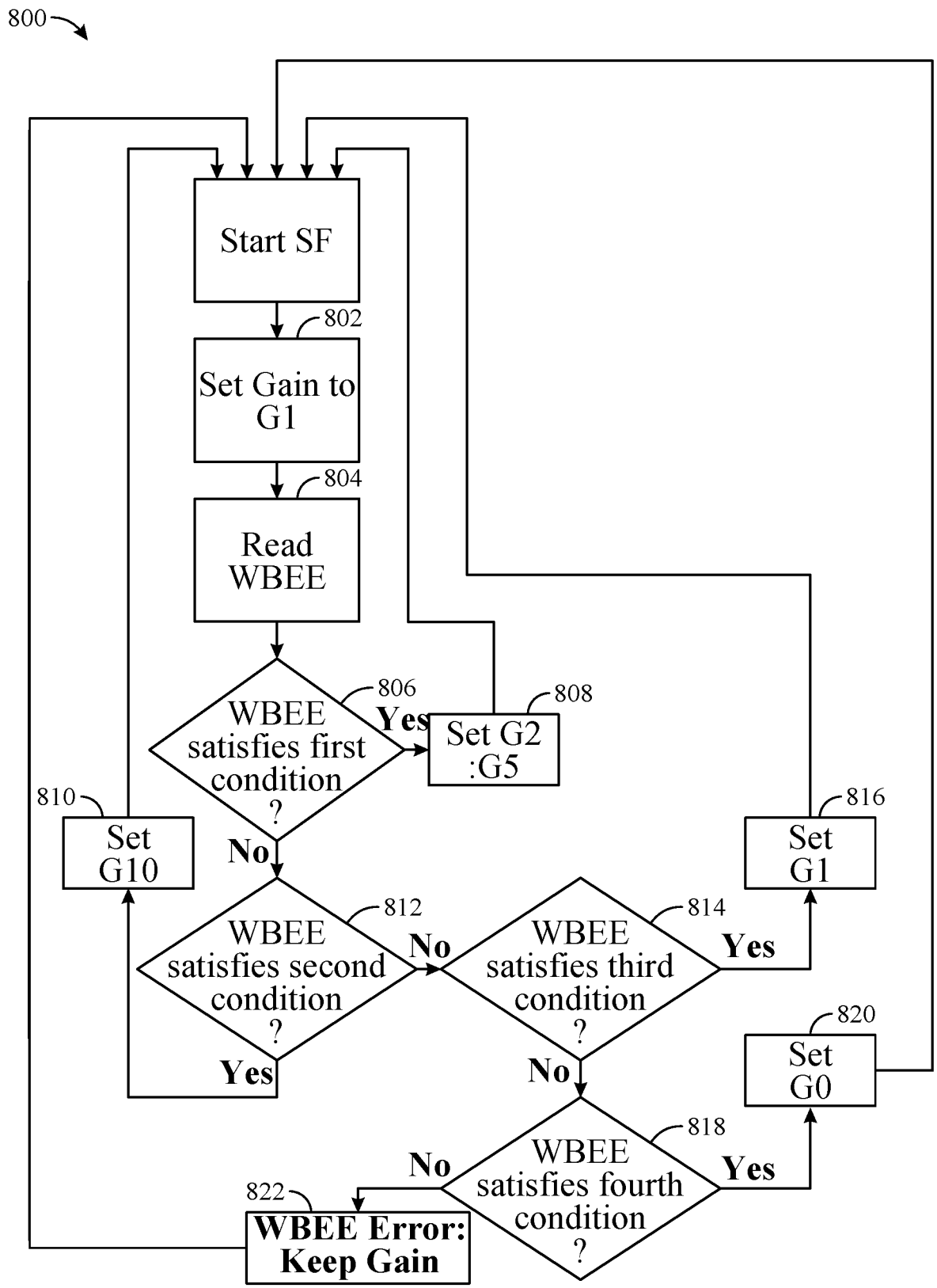
FIG. 8 is a flowchart of a method for performing one-step "fast" AGC, according to certain aspects of the present disclosure.

FIG. 8 is a flowchart of a method 800 for performing one-step "fast" AGC, according to certain aspects of the present disclosure. The method 800 may be performed by a controller (e.g., controller 336). In some aspects, the method 800 may be performed using the table 700 depicted in FIG. 7. For example, the controller may select one of the multiple gain states depicted in table 700 for the cascaded RF+baseband gain of the AGC scheme 600 depicted in FIG. 6. In some aspects, the method 800 may be performed using the table 1300 depicted in FIG. 13. For example, the controller may select one of the multiple gain states depicted in table 1300 for the cascaded RF+baseband gain of the AGC scheme 600 depicted in FIG. 6.

Method 800 may enter at block 802, where the controller sets the initial gain state (GS) to G1 (e.g., G1 depicted in table 700 of FIG. 7) at the start (or beginning) of the subframe. At block 804, the controller reads the WBEE after a predetermined amount of time has elapsed from the start of the subframe. In some aspects, the WBEE detection range may be less than the ADC dynamic range. In a reference example, the WBEE detection range may be approximately 32 dB at receiver switch point (having a BO of 18 dB from the ADC FS), whereas the ADC dynamic range may be approximately 75 dB.

Because the WBEE detection range may be smaller than the ADC dynamic range, aspects described herein may use multiple ranges and/or thresholds over the ADC dynamic range for the gain state selection. Referring to FIG. 7, for example, a range 702 may be used for detection over the lowest range of the WBEE detection range for selecting a first set of gain states (e.g., G1 and G0 depicted in table 700, based on WBEE within 16 dBm below the G1 to G2 switch point). In some cases, the range 702 may include a sub-range 704 for selecting a first gain state within the first set of gain states (e.g., G0 depicted in table 700, based on WBEE within 4 dBm below the G0 to G1 switch point) and a sub-range 706 for selecting a second gain state within the first set of gain states (e.g. G1 depicted in table 700, based on WBEE within 12 dBm above the G0 to G1 switch point). A range 708 may be used for the upper range of the WBEE detection range for selecting a second set of gain states (e.g., G2 to G5 depicted in table 700, based on detection within 16 dBm above the G1 to G2 switch point). Additionally, a range 710 may be used for selecting a third set of gain states (e.g., G10 or G11 depicted in table 700), when the WBEE exceeds its detection range (e.g., G10 depicted in table 700 may be selected when the WBEE is greater than the G5 to G6 switch point).

Referring back to FIG. 8, at block 806, the controller determines whether the WBEE satisfies a first condition. The first condition may include whether the WBEE is within a first range (e.g., range 708). If, at block 806, the controller determines the WBEE satisfies the first condition, then the controller selects a gain state from a set of gain states associated with the first range (e.g., G2 to G5 depicted in table 700) (block 808) and continues to the start of the next (or subsequent) subframe. If, at block 806, the controller determines that the WBEE does not satisfy the first condition (e.g., the WBEE is not within the first range), then the controller proceeds to block 812.

At block 812, the controller determines whether the WBEE satisfies a second condition. The second condition may include whether the WBEE exceeds a detection range (e.g., WBEE is within range 710). If, at block 812, the controller determines the WBEE satisfies the second condition, then the controller selects a gain state from a set of gain states associated with the WBEE exceeding its detection range (e.g., G10 and G11 depicted in table 700) (block 810) and continues to the start of the next (or subsequent) subframe. If, at block 812, the controller determines the WBEE does not satisfy the second condition (the WBEE does not exceed its detection range), then the controller proceeds to block 814.

At block 814, the controller determines whether the WBEE satisfies a third condition. The third condition may include whether the WBEE is within a second range (e.g., sub-range 706). If, at block 814, the controller determines the WBEE satisfies the third condition, then the controller selects a gain state from a set of gain states associated with the second range (e.g., G1 depicted in table 700) (block 816) and continues to the start of the next (or subsequent) subframe. If, at block 814, the controller determines that the WBEE does not satisfy the third condition (e.g., the WBEE is not within the second range), then the controller proceeds to block 818.

At block 818, the controller determines whether the WBEE satisfies a fourth condition. The fourth condition may include whether the WBEE is within a third range (e.g., sub-range 704). If, at block 818, the controller determines the WBEE satisfies the fourth condition, then the controller selects a gain state from a set of gain states associated with the third range (e.g., G0 depicted in table 700) (block 820) and continues to the start of the next (or subsequent) subframe. If, at block 818, the controller determines that the WBEE does not satisfy the fourth condition (e.g., the WBEE is not within the third range), then the controller determines there has been a WBEE error, may maintain the gain state (e.g. at G1) (block 822), and may proceed to the start of the next (or subsequent) subframe.

Figure 9:
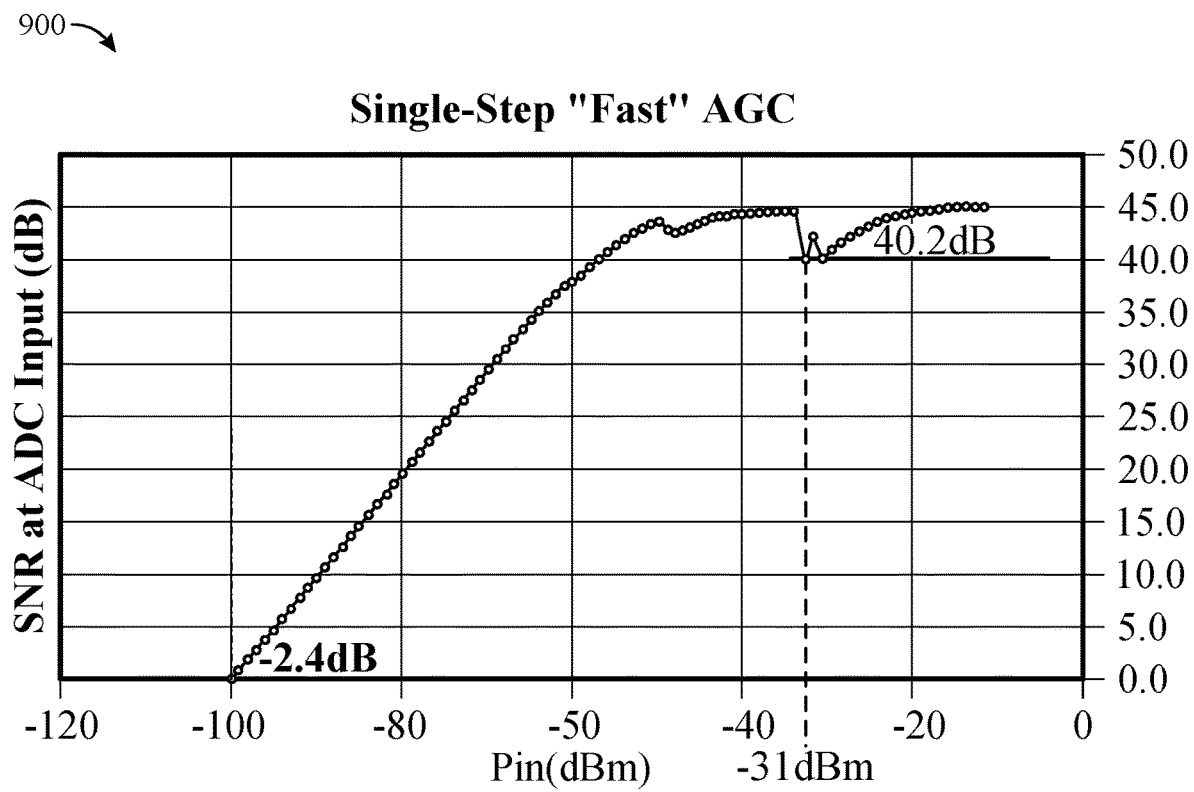
FIG. 9 is a graph of signal-to-noise ratio based on a single-step AGC applied to a receiver, according to certain aspects of the present disclosure.

FIG. 9 is a graph 900 of SNR based on a single-step "fast" AGC applied to the RX path (e.g., RX path 304) of a wireless receiver, according to certain aspects of the present disclosure. As shown, the SNR may increase until the WBEE range hits the G5 switch point. When the WBEE range exceeds the G5 switch point (e.g., WBEE>−31 dBm), the AGC logic switches from G5 to G10, which causes a reduction in the SNR.

Example Fast Automatic Gain Control in Bypass and Filter Modes

As noted, certain conventional wireless receivers (e.g., conventional C-V2X receivers) typically include a filter (e.g., BPF) (prior to an amplifier (e.g., BPF)) in the RX RF front-end circuitry and use the filter to mitigate the impact of jamming signals on the RX path of the wireless receiver. However, while a filter may be used to mitigate the impact of jamming signals, the filter may degrade the RX noise figure and, in turn, cause unnecessary desensing of the RX operations when jamming signals are not present.

Accordingly, certain aspects described herein provide techniques for operating a wireless receiver with different operating modes in the RX path, based on whether the wireless receiver is in the presence of jamming signals. The operating modes may include, for example, a filter mode and a bypass mode. The wireless receiver may operate with the filter mode in the RX path when the wireless receiver detects jamming signals over a pre-defined threshold. For example, the filter mode may protect the RX path of the wireless receiver from OOB jamming signals, including, for example, compression of two-tones intermodulation products that fall in-band of the RX path of the wireless receiver. On the other hand, the wireless receiver may operate with the bypass mode in the RX path when the wireless receiver is not in the presence of jamming signals (e.g., the wireless receiver has not detected jamming signals over a predefined amount of time). When operating with the bypass mode in the RX path, the wireless receiver may allow a reception signal to bypass the filter (e.g., BPF) in the RX path, so that the RX path is minimally impacted by the degradation of the noise figure caused by the filter.

Figure 10:
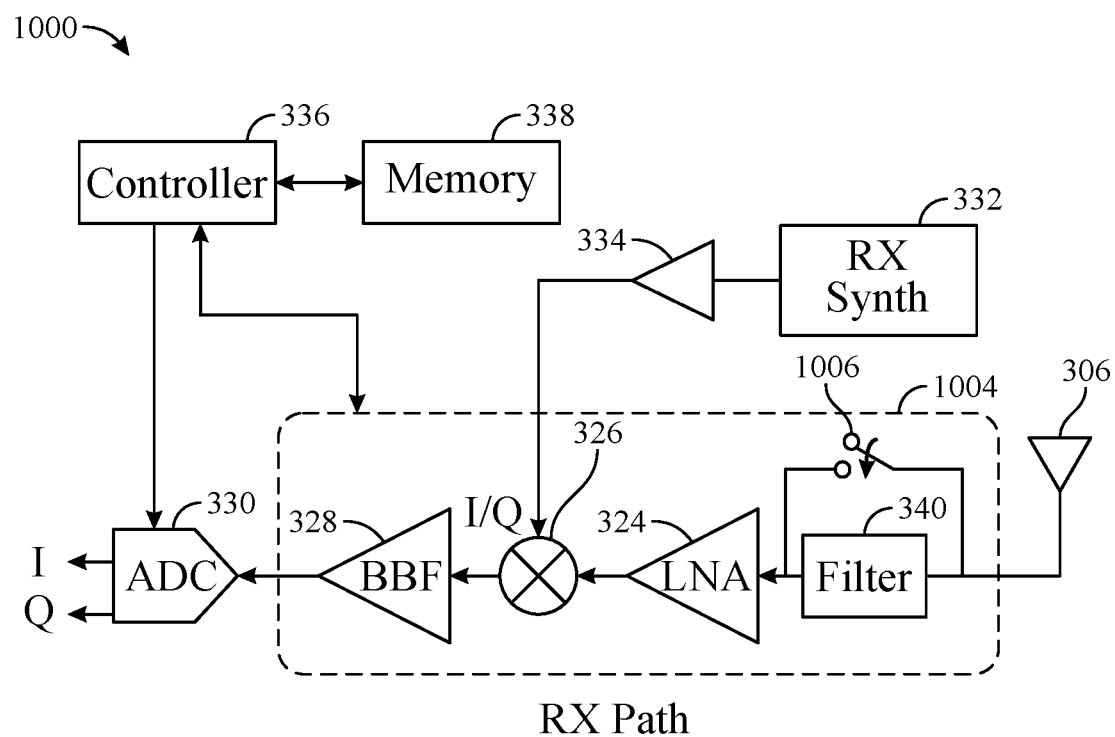
FIG. 10 illustrates an example RX path configured to support a filter mode and a bypass mode, according to certain aspects of the present disclosure.

FIG. 10 illustrates an example RX path 1004 of a receiver front-end 1000 configured to support a filter mode and a bypass mode, according to certain aspects of the present disclosure. For certain aspects, the receiver front-end 1000 may be part of a transceiver front-end, such as the transceiver front-end 300 of FIG. 3. As shown, compared to the RX path 304 of the transceiver front-end 300 depicted in FIG. 3, the RX path 1004 includes a switch 1006 coupled in parallel with the filter 340 (e.g., BPF) that allows for bypassing the filter 340. The operation of the switch 1006 may be controlled by the controller 336, for example.

Figure 11:
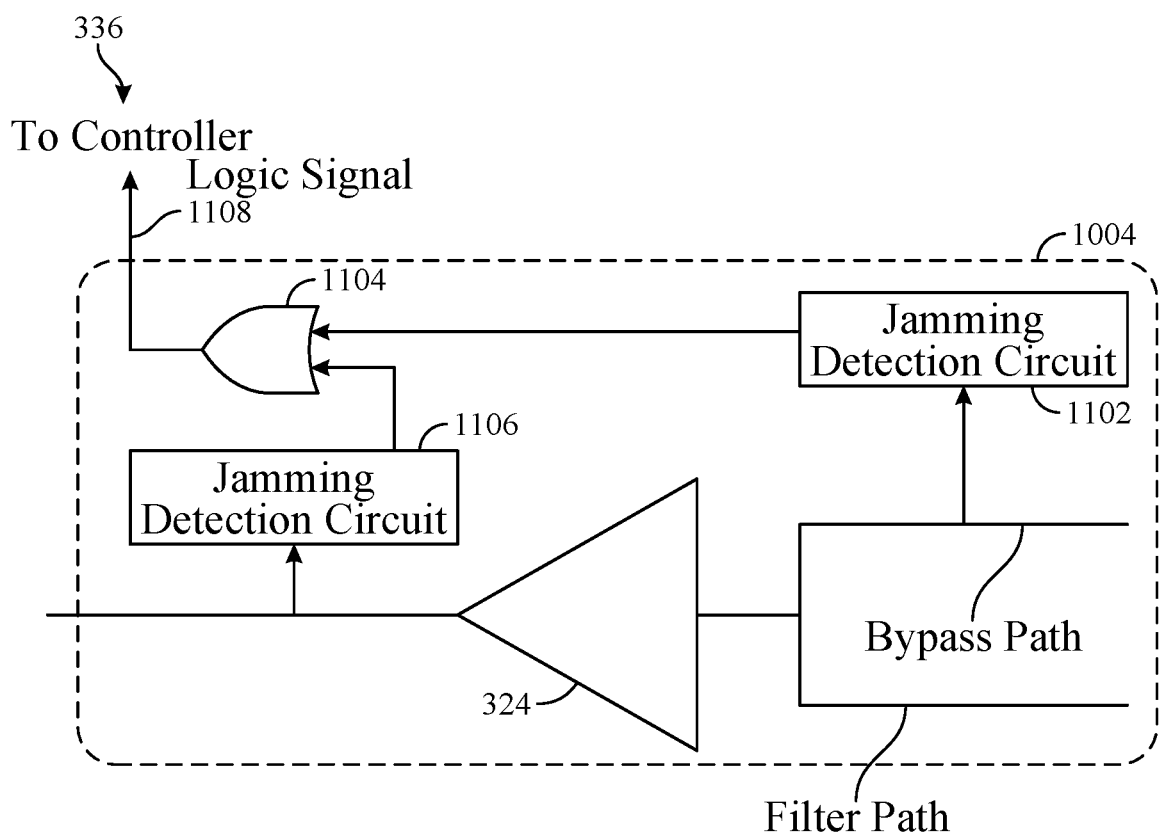
FIG. 11 further illustrates certain components of the RX path illustrated in FIG. 10, according to certain aspects of the present disclosure.

FIG. 11 illustrates an example of j amming detection circuitry for the RX path 1004 of the receiver front-end 1000, according to certain aspects of the present disclosure. The jamming detection circuitry includes a jamming detection circuit 1102, a jamming detection circuit 1106, and logic ("OR") gate 1104. The jamming detection circuit 1102 has an input coupled to the bypass path (e.g., via switch 1006) from the antenna 306. The jamming detection circuit 1106 has an input coupled to the output of the LNA 324.

The jamming detection circuits 1102 and 1106 may include circuitry for determining the power of a received analog signal. Each of the jamming detection circuits 1102 and 1106 can generate a respective logic signal that indicates whether a jamming signal has been detected (e.g., power of the received analog signal is greater than a threshold). The logic gate 1104 may receive the logic signals from the jamming detection circuits 1102 and 1106 and output a logic signal 1108 that indicates whether a jamming signal has been detected.

Figure 12:
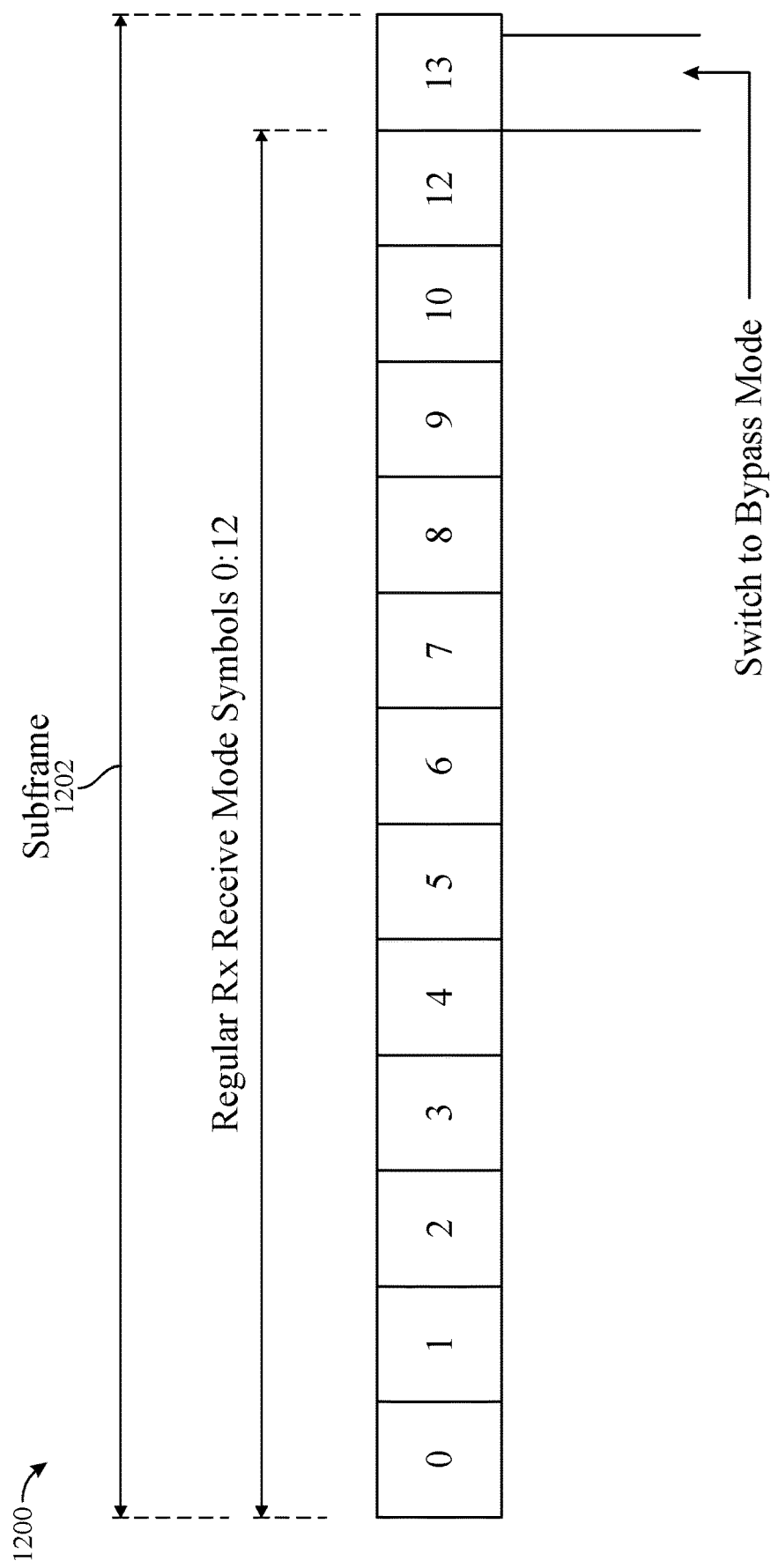
FIG. 12 illustrates an example timeline for operating a receiver, according to certain aspects of the present disclosure.

In certain aspects, the RX path 1004 may be configured to use the filter mode as a default mode during a first set of symbols of a subframe, and use the bypass mode during at least a portion of a second symbol outside the first set of symbols of the subframe to check for the presence of a jamming signal (e.g., determine whether the logic signal 1108 indicates a jamming signal has been detected). For example, certain communication systems (C-V2X communication systems) may allow wireless transmitters to be active during the first set of symbols of a subframe, but may not allow the wireless transmitters to be active during the second symbol of the subframe. Referring to the example timeline 1200 illustrated in FIG. 12, a wireless transmitter (e.g., C-V2X transmitter) may be active over symbols 0 through 12 of subframe 1202 and may be inactive (e.g., in silence mode or blanking mode) during symbol 13 of subframe 1202.

In certain aspects, because wireless transmitters may be active over symbols 0 through 12 of subframe 1202, the RX path may be configured (via controller 336) to operate in filter mode during symbols 0 through 12 of subframe 1202 in order to protect the RX path from jamming signals. In certain aspects, the RX path may be configured (via controller 336) to use the symbol 13 silence period to switch to bypass mode in order to detect whether a jamming signal has been detected. For example, the controller 336 may check in the symbol 13 silence period whether the logic signal 1108 indicates that a jamming signal has been detected. In one aspect, the RX path may be configured to switch back to the filter mode over symbols 0 through 12 of a subsequent subframe. In another aspect, rather than switch back to the filter mode over symbols 0 through 12 of the subsequent subframe, the controller 336 may configure the RX path to switch to the bypass mode for at least symbols 0 through 12 of the subsequent subframe if the controller 336 determines that a number of times in which a jamming signal has not been detected at symbol 13 is greater than a threshold.

In certain aspects, the controller 336 may perform "fast" AGC for the RX path 1004 when the RX path is operating in filter mode and bypass mode. In one aspect, the controller 336 may perform "fast" AGC for the RX path 1004 when the RX path is operating in filter mode, based on the method 800 illustrated in FIG. 8 and table 700 illustrated in FIG. 7. In one aspect, the controller 336 may perform "fast" AGC for the RX path 1004 when the RX path is operating in bypass mode, based on the method 800 illustrated in FIG. 8 and table 1300 of switch points for multiple gain states of a receiver illustrated in FIG. 13.

In certain aspects, after the RX path switches to bypass mode, the RX path may continue operating in bypass mode until a jamming signal has been detected (e.g., logic signal 1108 indicates a jamming signal has been detected). When a jamming signal has been detected, the controller 336 may configure the RX path to switch back to the filter mode in order to protect the RX path from desensing due to jamming signals. Note, in some instances, there may be potential damage to the symbol (and subframe) (in which the transition occurs) due to transitioning between the filter mode and bypass mode. In such cases, the controller 336 may perform at least one of amplitude correction or phase correction when switching between bypass mode and filter mode in order to reduce (or eliminate) the damage of losing the symbol and related subframe.

Figure 14:
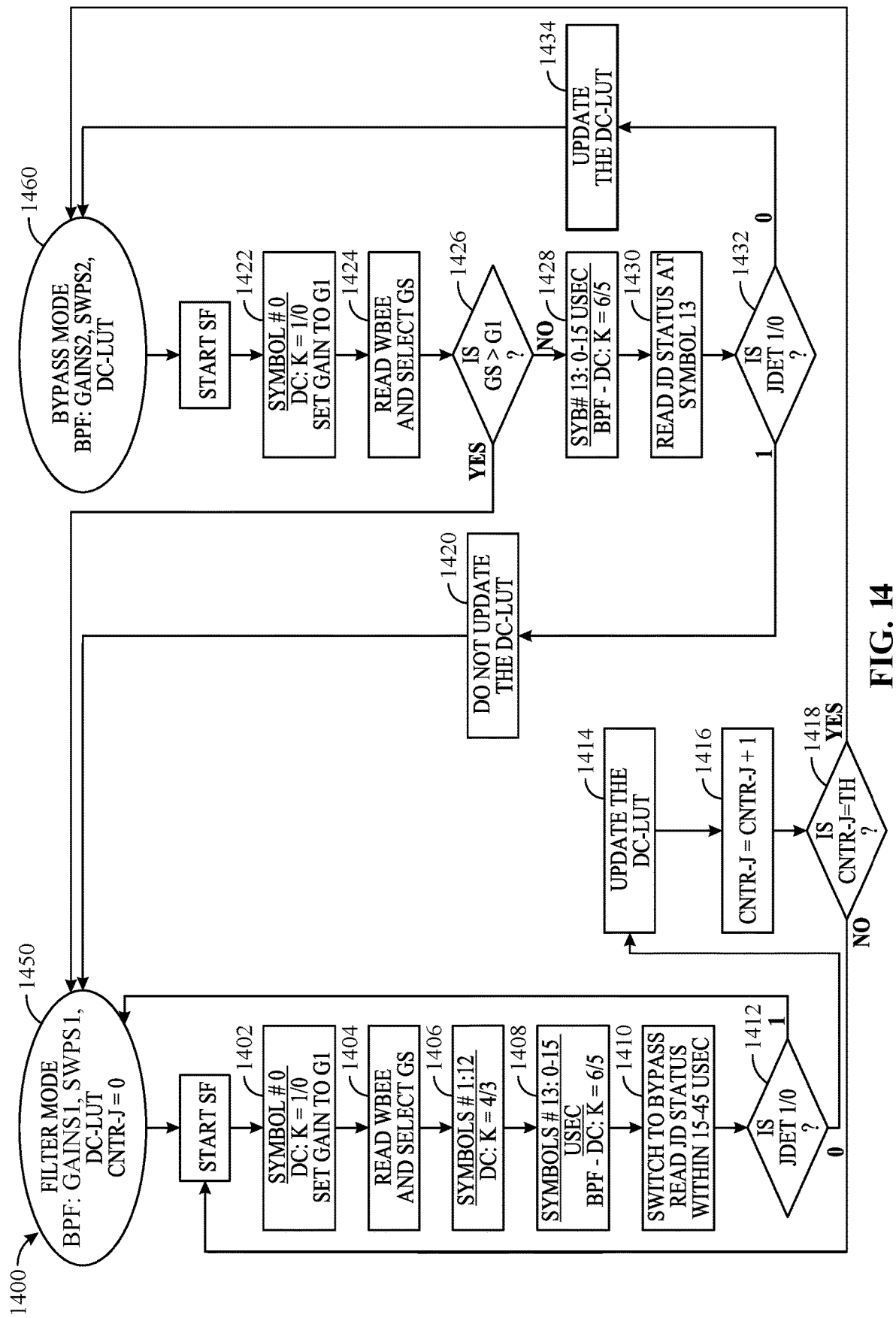
FIG. 14 is a flowchart of a method for performing "fast" AGC for a receiver operating in a filter mode and a bypass mode, according to certain aspects of the present disclosure.

FIG. 14 is a flowchart of a method 1400 for performing "fast" AGC for a receiver front-end (e.g., receiver front-end 1000) that supports a filter mode and a bypass mode in the RX path (e.g., RX path 1004), according to certain aspects of the present disclosure. The method 1400 may be controlled by a controller (e.g., controller 336).

Method 1400 may enter at block 1450, where the controller configures the receiver front-end to operate with a filter mode (e.g., BPF mode) in the RX path. As part of configuring the receiver front-end to operate with the filter mode in the RX path, the controller may set a jamming counter (CNTR-J) to 0 (or some other initial value). The jamming counter may be used to keep track of a number of times that a jamming signal has not been detected in a symbol (e.g., symbol 13) of a subframe. When the receiver front-end is configured to operate with the filter mode, the controller may use a set of gains and switch points associated with the filter mode (e.g., table 700 illustrated in FIG. 7).

At block 1402, in symbol 0 of the subframe, the controller sets the DC correction value (K) to I/O and sets the gain to G1. At block 1404, in symbol 0 of the subframe, the controller reads the WBEE and selects a gain state from a set of gain states, based on the WBEE. The operations in block 1402 and block 1404 may be performed using the gain states illustrated in table 700 of FIG. 7. At block 1406, the controller sets the DC correction value (K) to 4/3 at a point in time during symbols 1 through 12 of the subframe.

Figure 15A:
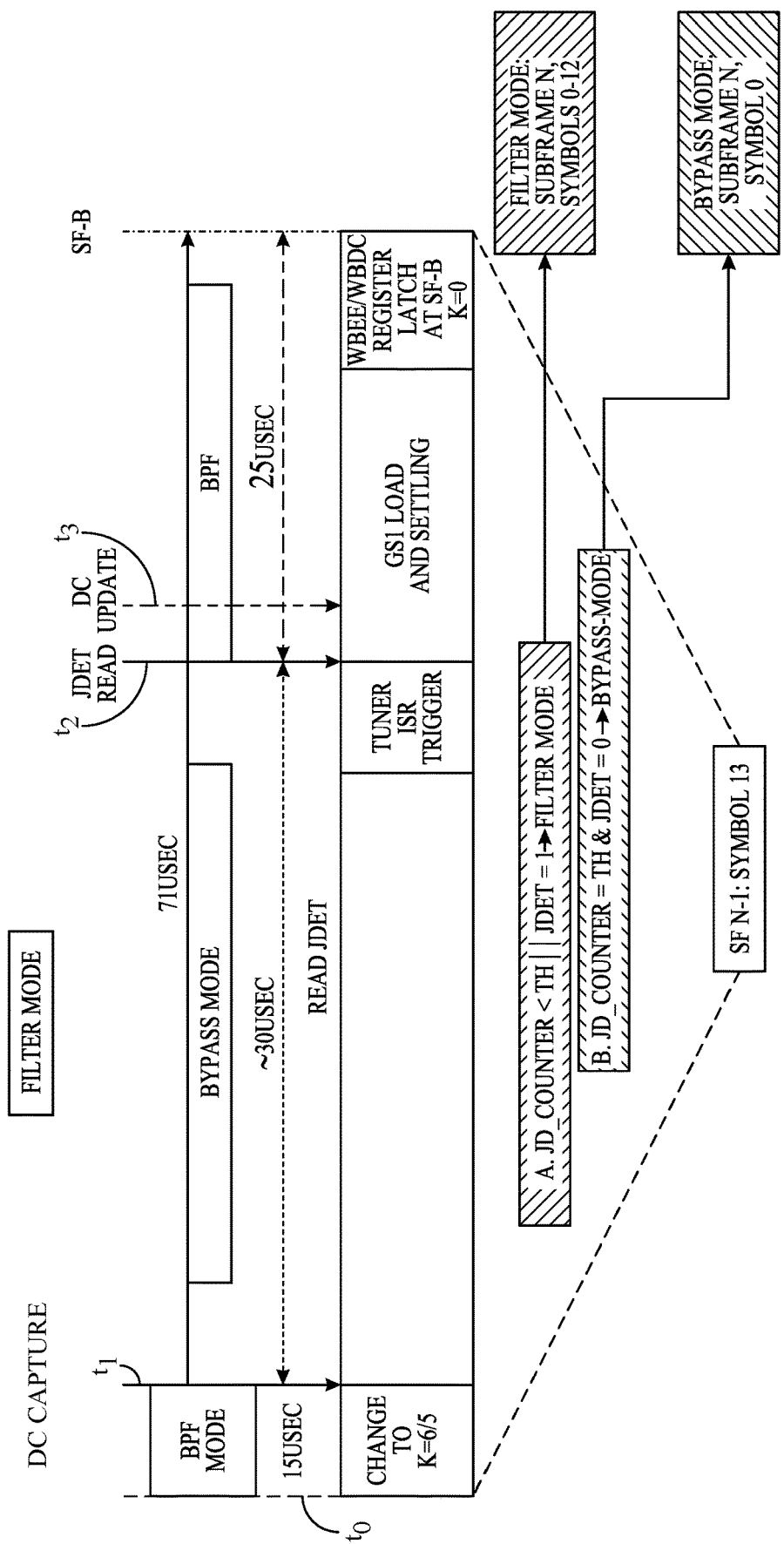
FIG. 15A illustrates an example symbol of a subframe, according to certain aspects of the present disclosure.

At block 1408, during symbol 13 of the subframe, the controller updates the DC correction value (K) to 6/5. For example, as shown in FIG. 15A, which illustrates an example symbol 13 of a subframe N−1, the controller changes the DC correction value between $t_0$ and $t_1$ of symbol 13 of subframe N−1. At block 1410, the controller configures the RX path to operate in bypass mode and reads a status of jamming detection circuitry (e.g., logic signal 1108). As shown in FIG. 15A, for example, the controller reads the status of the jamming detection circuitry at $t_2$ of symbol 13 of subframe N−1.

At block 1412, the controller determines whether the status of the jamming detection circuitry is "1" or "0" (e.g., whether logic signal 1108 is "1" or "0"). If the status of the jamming detection circuitry is "1," then the controller configures the receiver front-end to continue operating with filter mode in the RX path for a subsequent subframe. As shown in FIG. 15A, for example, the RX path switches to filter mode at $t_2$ of symbol 13 of subframe N−1 and may continue in the filter mode for at least a portion of subframe N. The controller may or may not update the DC-LUT after determining the status of the jamming detection circuitry is "1" in block 1412.

On the other hand, if the status of the jamming detection circuit is "0," then the controller updates the DC look up table (LUT) (block 1414). For example, as shown in FIG. 15A, the controller performs the DC LUT update at $t_3$ of symbol 13 of subframe N−1 as shown in FIG. 15A. The controller also updates (e.g., increments) the jamming counter (CNTR-J) (block 1416) and determines whether the jamming counter reaches a threshold (e.g., 1000 or some other value) (block 1418).

If the jamming counter has not reached the threshold, then the controller configures the receiver front-end to continue operating with filter mode in the RX path for the subsequent subframe, e.g., as shown in FIG. 15A. On the other hand, if the jamming counter has reached the threshold, then the controller proceeds to 1460, where the controller configures the receiver front-end to operate with bypass mode in the RX path for the subsequent subframe. Note, in some cases, the controller may still configure the receiver front-end to switch back to filter mode for a remaining portion of symbol 13 of the current subframe regardless of the determination of whether to switch to bypass mode for the subsequent subframe or remain in filter mode for the subsequent subframe. As shown in FIG. 15A, for example, the RX path switches back to filter mode after the jamming detection circuit (JDET) read at $t_2$ of symbol 13 of subframe N−1.

Figure 15B:
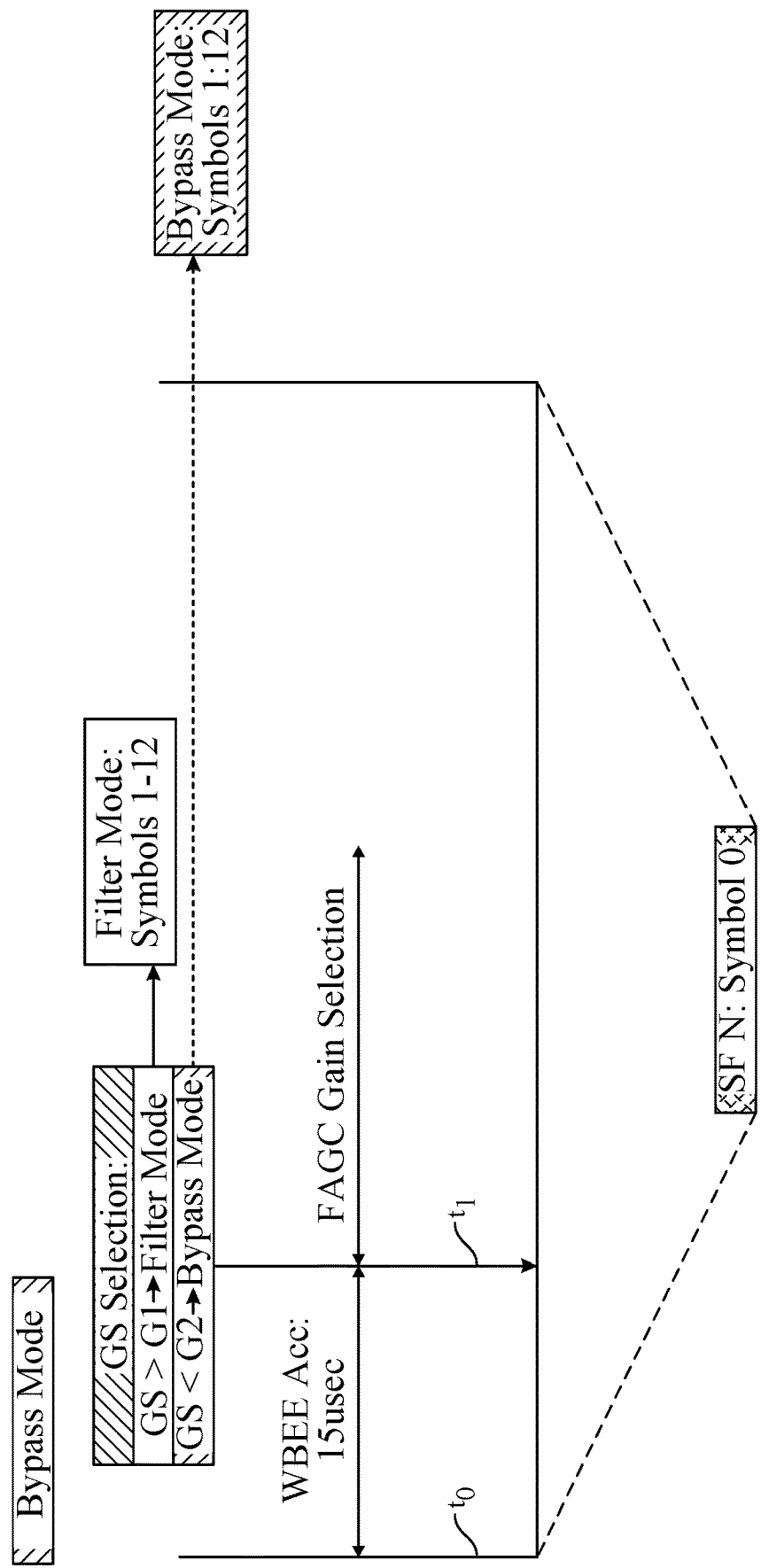
FIG. 15B illustrates an example symbol of a subframe subsequent to the subframe depicted in FIG. 15A, according to certain aspects of the present disclosure.

When the receiver front-end is configured to operate with the bypass mode, the controller may use a set of gains and switch points associated with the bypass mode (e.g., table 1300 illustrated in FIG. 13). The operations in blocks 1422 and 1424 are similar to the operations in blocks 1402 and 1404, respectively, except that the blocks 1422 and 1424 are performed using the gain states illustrated in table 1300 of FIG. 13. At block 1426, the controller determines whether the selected gain state is greater than G1. If so, then the controller configures the receiver front-end to operate with filter mode in the RX path for the remainder of the subframe (e.g., as shown in FIG. 15B). If the selected gain state is not greater than G1, then the controller updates the DC correction value K=6/5 (block 1428). At block 1430, the controller, in symbol 13, reads a status of the jamming detection circuitry. At block 1432, the controller determines whether the status of the jamming detection circuitry is "1" or "0". If the status of the jamming detection circuitry is "0," then the controller updates the DC-LUT (block 1434) and configures the receiver front-end to continue operating with bypass mode in the RX path for the subsequent subframe (e.g., as shown in FIG. 15C). On the other hand, if the status of the jamming detection circuit is "1," then the controller refrains from updating the DC-LUT (block 1420), and configures the receiver front-end to operate with filter mode in the RX path for the subsequent subframe (e.g., as shown in FIG. 15C).

Note that while method 1400 describes setting the jamming counter to 0 and incrementing the jamming counter until this counter reaches a threshold (e.g., 1000), in certain aspects, method 1400 may also be implemented by setting the jamming counter to a threshold value (e.g., 1000) and decrementing the jamming counter until this counter reaches 0. Additionally, note that while method 1400 describes checking the status of RF jamming detection circuitry for an OOB jamming signal, in certain aspects, the controller may perform WiFi detection in the digital domain to determine whether to switch from filter mode to bypass mode.

Example Operations

Figure 16:
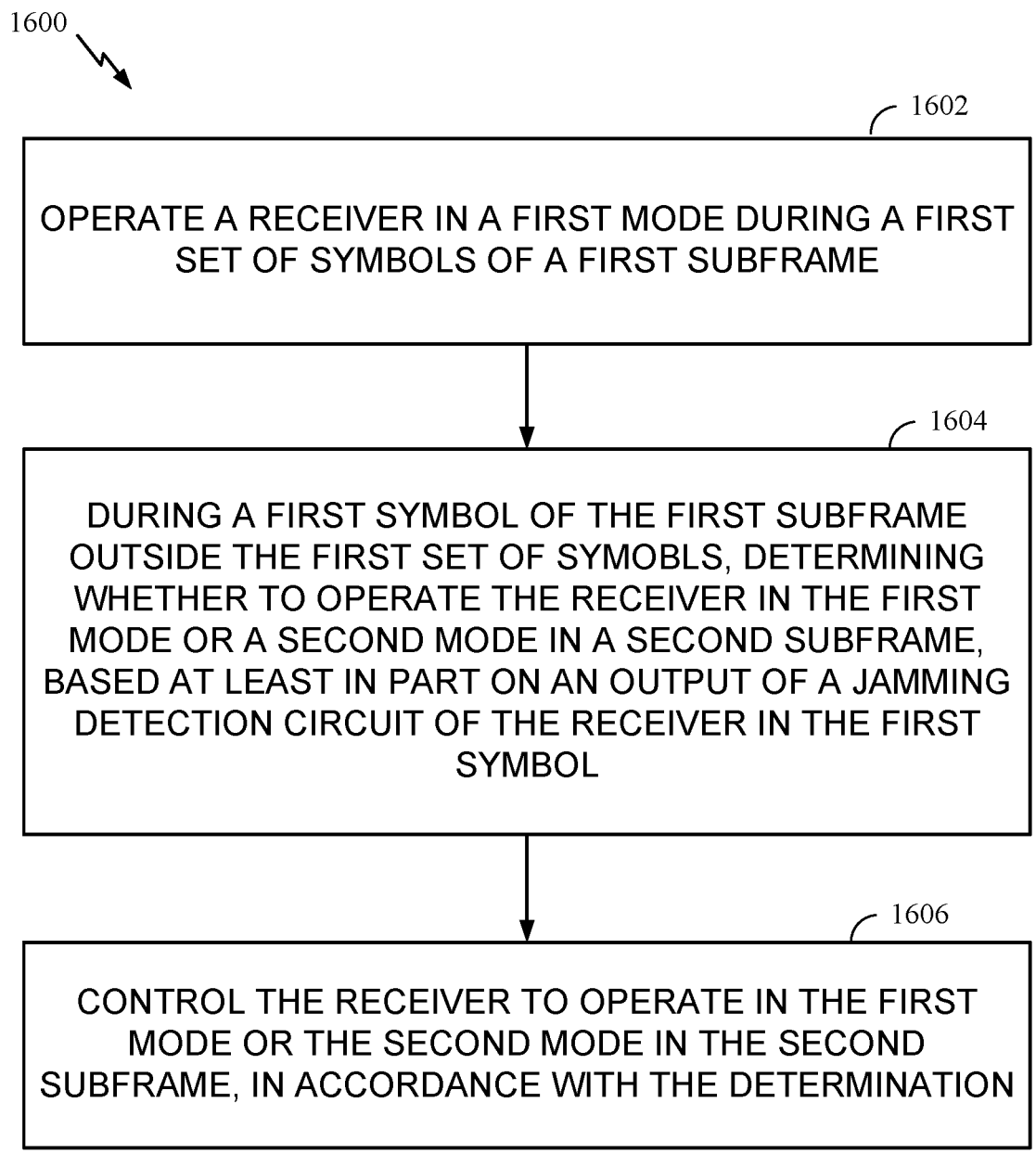
FIG. 16 is a flow diagram of example operations for operating a receiver in a filter mode and a bypass mode, in accordance with certain aspects of the present disclosure.

FIG. 16 is a flow diagram of example operations 1600 for operating a receiver (e.g., RX path 1004 of a receiver) in a filter mode and a bypass mode, in accordance with certain aspects of the present disclosure.

The operations 1600 may generally involve, at block 1602, operating a receiver (e.g., RX path 1004) in a first mode (e.g., filter mode) during a first set of symbols (e.g., symbols 0-12) of a first subframe (e.g., subframe N−1).

The operations 1600 further involve, at block 1604, during a first symbol (e.g., symbol 13) of the first subframe outside the first set of symbols, determining whether to operate the receiver in the first mode or a second mode (e.g., bypass mode) in a second subframe (e.g., subframe N) based at least in part on an output (e.g., logic signal 1108) of a jamming detection circuit (e.g., jamming detection circuit 1102, jamming detection circuit 1106) of the receiver in the first symbol.

The operations 1600 further involve, at block 1606, controlling the receiver to operate in the first mode or the second mode in the second subframe, in accordance with the determination.

In one aspect, the operations 1600 may further include operating a transmitter (e.g., TX path 302 of transceiver front-end 300), where the transmitter is configured to refrain from transmitting during the first symbol. In one aspect, the first symbol (e.g., symbol 13) may be subsequent to the first set of symbols (e.g., symbols 0-12) of the first subframe (e.g., subframe N−1). In one aspect, the receiver may be configured to receive C-V2X reception signals.

In one aspect, the operations 1600 may further include switching from operating the receiver in the first mode to operating the receiver in the second mode for a first portion of the first symbol. In this aspect, the determination (in block 1604) may be based on the output of the jamming detection circuit in the first portion of the first symbol.

For example, the determination (in block 1604) may be to operate the receiver in the first mode in the second subframe when the output of the jamming detection circuit indicates that a WiFi or any out-band jammer signal has been detected. In another example, the determination (in block 1604) may be to operate the receiver in the first mode in the second subframe when the output of the jamming detection circuit indicates a detection of a jamming signal. In one aspect, the jamming signal may occur in the first portion of the first symbol. In one aspect, the jamming signal may be an in-band signal caused by a third-order intermodulation product from at least two OOB signals.

In another example, the determination (in block 1604) may be to operate the receiver in the first mode in the second subframe when the output of the jamming detection circuit indicates that a jamming signal has not been detected and (ii) a predetermined condition is not satisfied. The predetermined condition may include a number of subframes in which a jamming signal is not detected being greater than a threshold.

In another example, the determination (in block 1604) may be to operate the receiver in the second mode in the second subframe when (i) the output of the jamming detection circuit indicates that a jamming signal has not been detected and (ii) a predetermined condition is satisfied. The predetermined condition may include a number of subframes in which a jamming signal is not detected being greater than a threshold.

In one aspect, controlling the receiver (in block 1606) to operate in the first mode or the second mode includes operating the receiver in the second mode for at least a first symbol of the second subframe. For example, in one aspect, the operations 1600 may further include (i) detecting an amount of energy of a reception signal during the first symbol of the second subframe and (ii) selecting, from a plurality of gain states, a gain state for the reception signal, based on the amount of energy. In this aspect, after the first symbol of the second subframe, the operations 1600 may further include (i) switching from operating the receiver in the second mode to operating the receiver in the first mode when the selected gain state does not satisfy a predetermined condition or (ii) operating the receiver in the second mode for a first set of symbols, including the first symbol, of the second subframe, when the selected gain state satisfies a predetermined condition. The operations 1600 may also further include performing at least one of amplitude correction or phase correction upon switching from operating the receiver in the second mode to operating the receiver in the first mode.

In one aspect, the operations 1600 may further include, during a second symbol of the second subframe outside the first set of symbols of the second subframe, (i) determining whether to operate the receiver in the first mode or the second mode in a third subframe, based at least in part on the output of the jamming detection circuit in the second symbol of the second subframe, and (ii) controlling the receiver to operate in the first mode or the second mode in the third subframe, in accordance with the determination during the second symbol of the second subframe. In one example, the determination may be to operate the receiver in the first mode in the third subframe when the output of the jamming detection circuit indicates detection of a jamming signal. In this example, the detection of the jamming signal may occur in a symbol of the first set of symbols of the second subframe. In another example, the determination may be to operate the receiver in the second mode in the third subframe when the output of the jamming detection circuit indicates that a jamming signal has not been detected.

In one aspect, operating the receiver in the first mode (e.g., filter mode) may include filtering a reception signal via a filter (e.g., filter 340, such as a BPF) prior to amplifying the reception signal (e.g., via LNA 324). In one aspect, operating the receiver in the second mode (e.g., bypass mode) may include bypassing a filter (e.g., filter 340, such as a BPF) prior to amplifying a reception signal (e.g., via LNA 324).
Example AGC for C-V2X in Filter Mode or Bypass Mode Based on RF Jammer Detection and V2X Signal Decoding As noted herein, certain aspects may allow a wireless receiver to switch between (i) operating with a filter mode in the RX path and (ii) operating with a bypass mode in the RX path, depending on whether the wireless receiver is in the presence of jamming signals. However, in some cases, the RF jamming detection circuitry in the RX RF receiver front-end may not be able to distinguish between OOB jamming signals and in-band signals (e.g., in-band C-V2X signals). In these cases, nearby UEs' V2X signals may cause the wireless receiver to switch to filter mode in the RX path and stay in filter mode for a long period of time, in order to avoid the risk of subframe corruption (e.g., assuming the activation of the jamming detection circuitry is related to a real jammer).

To address this, certain aspects described herein may enable the wireless receiver to perform C-V2X signal detection in order to determine whether the switch from bypass mode to filter mode in the RX path was due to detection of a V2X signal or an OOB jamming signal. As described below, certain aspects define at least one software (SFW) interface bit (e.g., SFW-V2X bit, SFW-J bit) for indicating whether the switch from bypass mode to filter mode in the RX path was due to detection of a V2X signal (SFW-V2X bit) or an OOB jamming signal (SFW-J bit).

In one aspect, a value of the SFW-V2X bit may be based on at least one of a cyclic redundancy check (CRC) and in-band received signal strength indicator (RSSI) measurement. In one aspect, the in-band RSSI of a reception signal may be compared to a predefined threshold associated with a RF jamming detection, and the SFW-V2X bit may be activated when the in-band RSSI exceeds the predefined threshold. The SFW-V2X bit may be provided after a predetermined amount of time (e.g., two subframes) has elapsed after the transition from bypass mode to filter mode in the RX path.

In some aspects, after the controller switches to operating with filter mode in the RX path, the controller may check a SFW-V2X bit to determine if the switch to filter mode was due to a V2X signal. If the SFW-V2X bit is activated (e.g., indicating that the switch was due to a V2X signal), then the controller may switch back to bypass mode in the RX path within a predetermined amount of time (e.g., two subframes). On the other hand, if the SFW-V2X bit is not activated (e.g., indicating that the switch was not due to a V2X signal), then the controller may continue operating with filter mode in the RX path. By enabling the controller to quickly (e.g., within two subframes) switch to bypass mode in the RX path when SFW-V2X bit is activated (e.g., SFW-V2X bit=1), aspects described herein can prevent the receiver front-end from being stuck in filter mode for a significant amount of time in situations where the receiver is in the presence of strong V2X signals.

In some aspects, the controller may also be able to enforce a filter mode in the RX path based on WiFi detection by activating another SFW interface bit associated with WiFi detection (e.g., SFW-J bit).

In some aspects, if a jamming signal is not identified in both main and diversity RX chains, then the controller may switch both RX chains from filter mode to bypass mode. Similarly, if one of the RX chains (e.g., main or diversity RX chain) is attacked by a jammer, the controller may switch all RX chains to filter mode.

Figure 17:
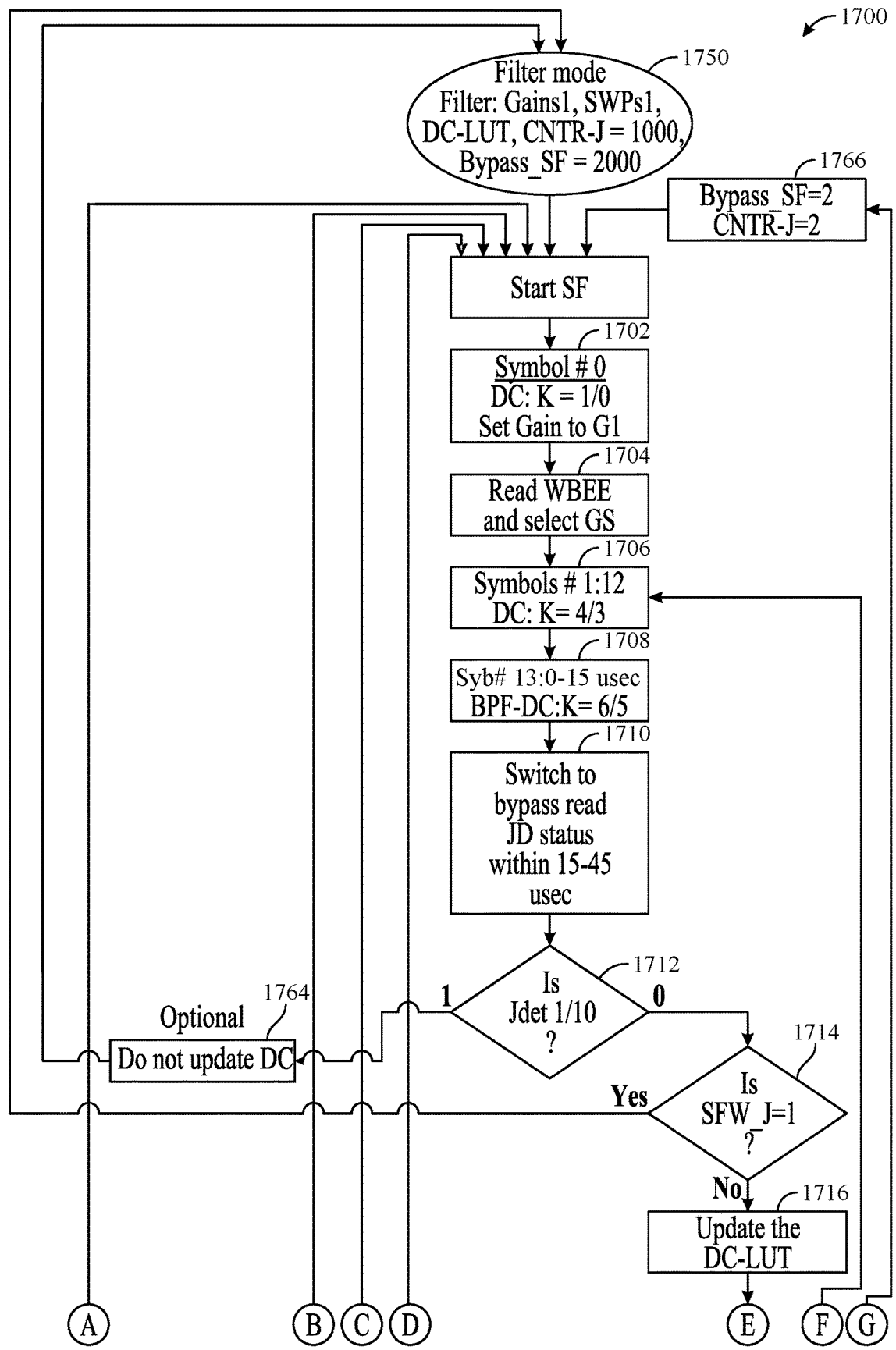
FIG. 17 illustrates an example flowchart of a method for operating a receiver, in accordance with certain aspects of the present disclosure.
Figure 17:
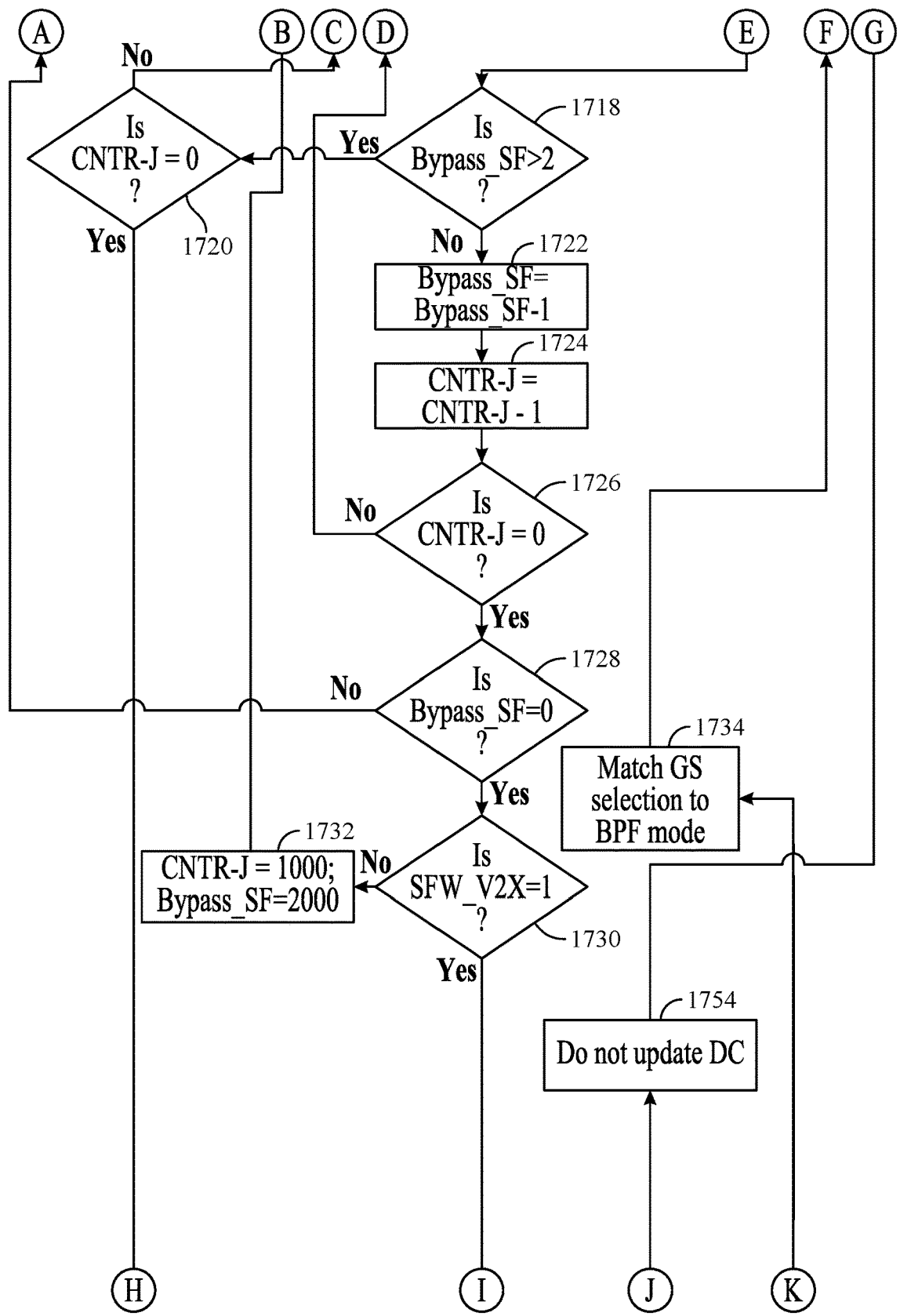
Figure 17:
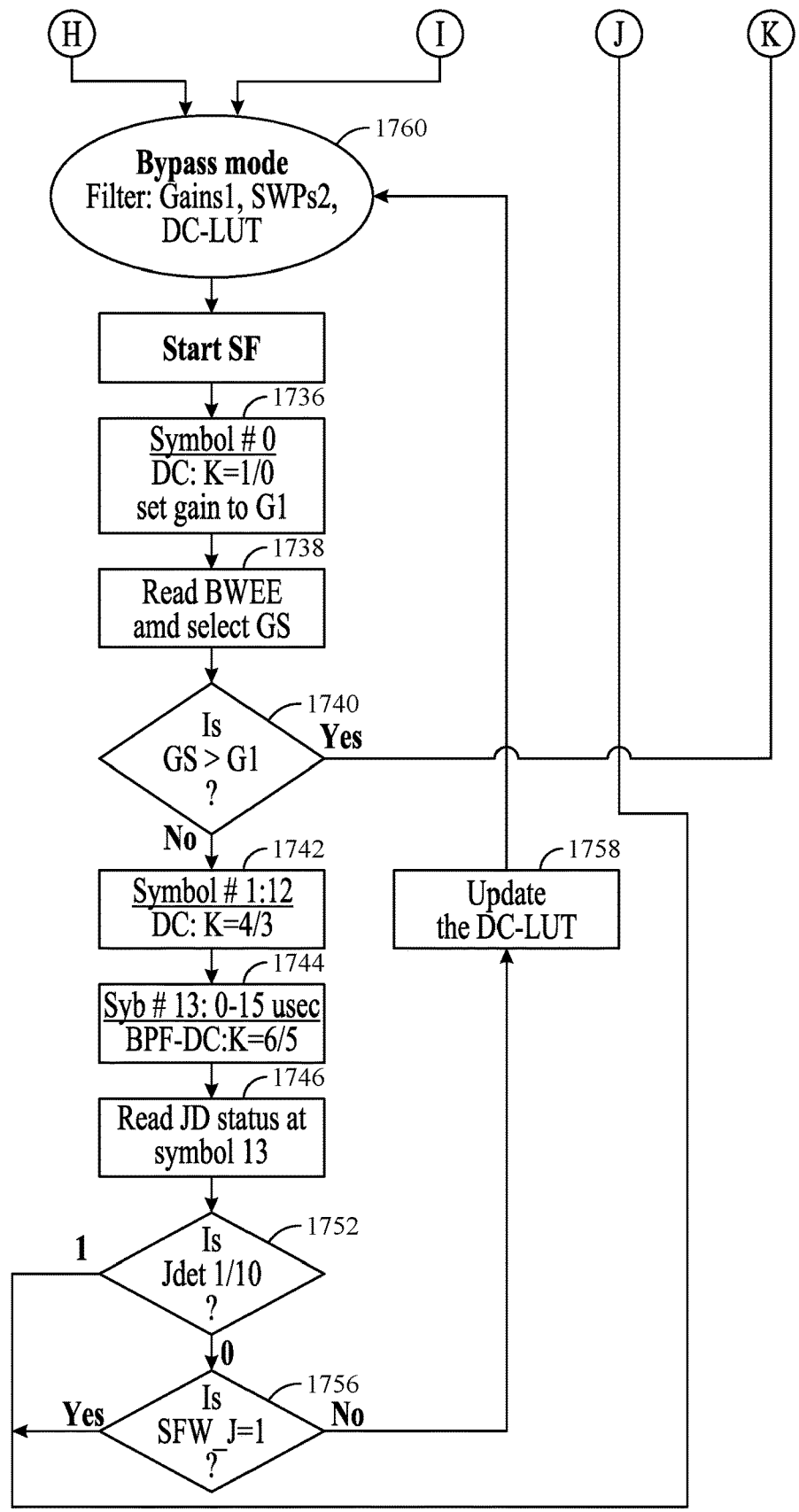

FIG. 17 illustrates a flowchart of a method 1700 for performing "fast" AGC for a receiver front-end (e.g., receiver front-end 1000), based on RF jamming signal detection and V2X signal detection, according to certain aspects of the present disclosure. The method 1700 may be controlled by a controller (e.g., controller 336).

Method 1700 may enter at block 1750, where the controller configures the receiver front-end to operate with a filter mode (e.g., BPF mode) in the RX path. As part of configuring the receiver front-end to operate with the filter mode in the RX path, the controller may set a jamming counter (CNTR-J) to 1000 (or some other initial value) and may set a bypass counter (Bypass SF) to 2000 (or some other initial value). The jamming counter may be used to keep track of a number of times that a jamming signal has not been detected in a symbol (e.g., symbol 13) of a subframe. The bypass counter may be used to track an amount of time the RX path has been in bypass mode. When the receiver front-end is configured to operate with the filter mode, the controller may use a set of gains and switch points associated with the filter mode (e.g., table 700 illustrated in FIG. 7).

At block 1702, in symbol 0 of the subframe, the controller sets the DC correction value (K) to I/O and sets the gain to G1. At block 1704, in symbol 0 of the subframe, the controller reads the WBEE and selects a gain state from a set of gain states, based on the WBEE. The operations in block 1702 and block 1704 may be performed using the gain states illustrated in table 700 of FIG. 7. At block 1706, the controller sets the DC correction value (K) to 4/3 at a point in time during symbols 1 through 12 of the subframe.

At block 1708, during symbol 13 of the subframe, the controller updates the DC correction value (K) to 6/5. At block 1710, the controller configures the RX path to operate in bypass mode and reads a status of jamming detection circuitry (e.g., logic signal 1108).

At block 1712, the controller determines whether the status of the jamming detection circuitry is "1" or "0" (e.g., whether logic signal 1108 is "1" or "0"). If the status of the jamming detection circuitry is "1," then the controller configures the receiver front-end to continue operating with filter mode in the RX path for a subsequent subframe. The controller may or may not update the DC-LUT (block 1764) after determining the status of the jamming detection circuitry is "1" in block 1712. On the other hand, if the status of the jamming detection circuit is "0," then the controller determines whether the SFW-J bit is activated (e.g., SFW-J bit=1) (block 1714). If the SFW-J bit is activated, then the controller configures the receiver front-end to continue operating with filter mode in the RX path for a subsequent subframe. If the SFW-J bit is not activated, then the controller updates the DC-LUT (block 1716).

At block 1718, the controller determines whether a bypass counter (e.g., Bypass SF) is greater than 2. If, at block 1718, the controller determines that the bypass counter is greater than 2, then the controller determines whether the jamming counter is equal to 0 (block 1720). If the jamming counter is not equal to 0, then the controller configures the receiver front-end to operate with filter mode in the RX path for the subsequent subframe. On the other hand, if the jamming counter is equal to 0, then the controller proceeds to 1760, where the controller configures the receiver front-end to operate with bypass mode in the RX path for the subsequent subframe.

If, at block 1718, the controller determines that the bypass counter is not greater than 2, then the controller updates (e.g., decrements) the bypass counter (e.g., Bypass_SF=Bypass_SF−1) (block 1722) and updates (e.g., decrements) the jamming counter (e.g., CNTR-J=CNTR-J−1) (block 1724). At block 1726, the controller determines whether the jamming counter is equal to 0. If the jamming counter is not equal to 0, then the controller configures the receiver front-end to operate with filter mode in the RX path for the subsequent subframe. If the jamming counter is equal to 0, then the controller proceeds to block 1728, where the controller determines whether the bypass counter is equal to 0.

If, at block 1728, the controller determines the bypass counter is not equal to 0, then the controller configures the receiver front-end to operate with filter mode in the RX path for the subsequent subframe. If, at block 1728, the controller determines the bypass counter is equal to 0, then the controller determines whether the SFW-V2X bit is activated (e.g., SFW-V2X=1) (block 1730). If the SFW-V2X bit is not activated, then the controller updates (e.g., resets) the jamming counter and the bypass counter (e.g., CNTR-J=1000 and Bypass_SF=2000) (block 1732). On the other hand, if the SFW-V2X bit is activated, then the controller configures the receiver front-end to operate with bypass mode in the RX path for the subsequent subframe (1760).

When the receiver front-end is configured to operate with the bypass mode, the controller may use a set of gains and switch points associated with the bypass mode (e.g., table 1300 illustrated in FIG. 13). The operations in blocks 1736 and 1738 are similar to the operations in blocks 1702 and 1704, respectively, except that the blocks 1736 and 1738 are performed using the gain states illustrated in table 1300 of FIG. 13. At block 1740, the controller determines whether the selected gain state is greater than G1. If so, then the controller matches the gain state selection to the filter mode (block 1734) and proceeds to block 1706. If the selected gain state is not greater than G1, then the controller updates the DC correction value to K=4/3 at a point in time during symbols 1 through 12 (block 1742) and updates the DC correction value to K=6/5 at a point in time during symbol 13 (block 1744).

At block 1746, the controller, in symbol 13, reads a status of the jamming detection circuitry. At block 1752, the controller determines whether the status of the jamming detection circuitry is "1" or "0". If the status of the jamming detection circuitry is "0," then the controller determines whether the SFW_J bit is equal to 1 (block 1756). If the SFW_J bit is not equal to 1, then the controller updates the DC-LUT (block 1758) and configures the receiver front-end to continue operating with bypass mode in the RX path for the subsequent subframe.

If the status of the jamming detection circuit is "1," then the controller refrains from updating the DC-LUT (block 1754), updates the bypass counter (e.g., Bypass SF=2) and the jamming counter (e.g., CNTR-J=2) (block 1766), and configures the receiver front-end to operate with filter mode in the RX path for the subsequent subframe. If, at block 1756, the SFW_J bit is equal to 1, then the controller proceeds to block 1754.

Note that while method 1700 describes setting the jamming counter to 1000 and decrementing the jamming counter until this counter reaches 0, in certain aspects, method 1700 may also be implemented by setting the jamming counter to 0 and incrementing the jamming counter until this counter reaches a threshold value (e.g., 1000). Likewise, while method 1700 describes setting the bypass counter to 2000 and decrementing the bypass counter until this counter reaches 0, in certain aspects, method 1700 may also be implemented by setting the bypass counter to 0 and incrementing the bypass counter until this counter reaches a threshold value (e.g., 2000).

In some cases, there may be some challenges with performing jamming detection and DC calibration in bypass mode. For example, the controller may obtain an incorrect DC calibration value in the presence of a jammer when performing DC calibration in bypass mode. In particular, any jammer that is detected within symbol 0 to symbol 13 of a subframe when the receiver is in bypass mode can corrupt the DC calibration. If the jammer that is detected in symbols 0 to 13 of a subframe disappears in the subsequent subframe, the incorrect DC calibration value may still be used for the subsequent subframe, leading to an incorrect AGC decision. Additionally, in some cases, the controller may have an insufficient amount of time in symbol 13 of a subframe to (i) fine-tune the DC calibration, (ii) read the status of RF jamming detection circuitry, and (iii) switch from bypass mode to filter mode (in case the status of the RF jamming detection circuitry indicates a jamming signal (e.g., JDET=1)) without updating the DC LUT.

To address this, aspects described herein provide techniques for performing DC calibration in filter mode (as opposed to in bypass mode) and reading a status of jamming detection circuitry in bypass mode (as opposed to in filter mode). Certain aspects define a DC calibration counter (e.g., CAL CNTR) that may be used to indicate when DC calibration was last performed during symbol 13. When the DC calibration counter expires, DC calibration may be performed during filter mode.

More specifically, in certain aspects, the controller may be configured to refrain from reading the status of jamming detection circuitry when the receiver is operating in filter mode. Instead, the controller may switch to bypass mode based on a subframe counter (SF_CNTR). For example, when the subframe counter expires, the controller may configure the receiver to operate with bypass mode. Once a jamming signal is detected in bypass mode, the controller may switch the receiver to operate with filter mode for a predetermined amount of time (e.g., a preconfigured subframe counter time, such as 2000).

When the receiver is in filter mode, the controller may continually update the DC calibration based on the selected GS for AGC. Additionally, a DC calibration counter (CAL CNTR) may be used to keep track of the amount of time that has elapsed since the last DC calibration in symbol 13. When the CAL CNTR expires, the controller may perform DC calibration in symbol 13 for one or more gain states. In some cases, if the receiver is operating in bypass mode when the CAL CNTR expires, then the controller may configure the receiver to switch to operate in filter mode, perform DC calibration for one or more gain states (while the receiver is in filter mode) in symbol 13, and then configure the receiver to switch to operate in bypass mode. If the receiver is operating in filter mode when the CAL CNTR expires, then the controller may perform DC calibration for one or more gain states (while the receiver is in filter mode) in symbol 13.

When switching from bypass mode to filter mode, once the controller determines that the status of the jamming detection circuitry indicates a jamming signal has been detected (e.g., JDET=1), the controller may set a bypass counter (Bypass_SF) to 2 subframes and check the status of the SFW-V2X bit in filter mode. If the status of the SFW-V2X bit is activated (e.g., SFW-V2X=1), then the controller may configure the receiver to switch to operate in bypass mode. If the status of the SFW-V2X bit is inactivated (e.g., SFW-V2X=0), then the controller may configure the receiver to stay in filter mode for a predetermined amount of time (e.g., the controller may set SF_CNTR to 2000 since the jammer was an OOB jammer as opposed to an in-band V2X jammer).

Figure 18:
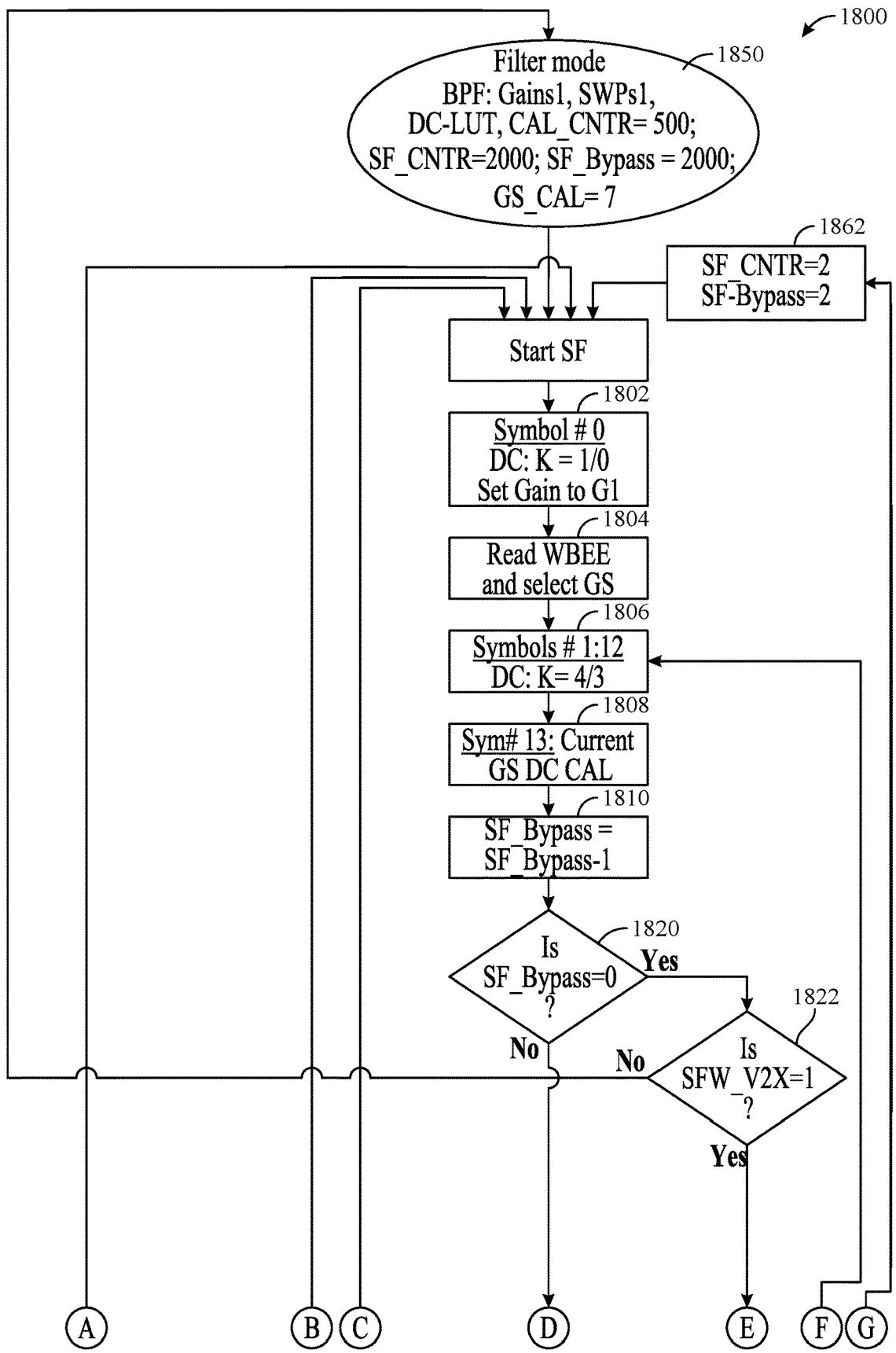
FIG. 18 illustrates an example flowchart of a method for operating a receiver, in accordance with certain aspects of the present disclosure.
Figure 18:
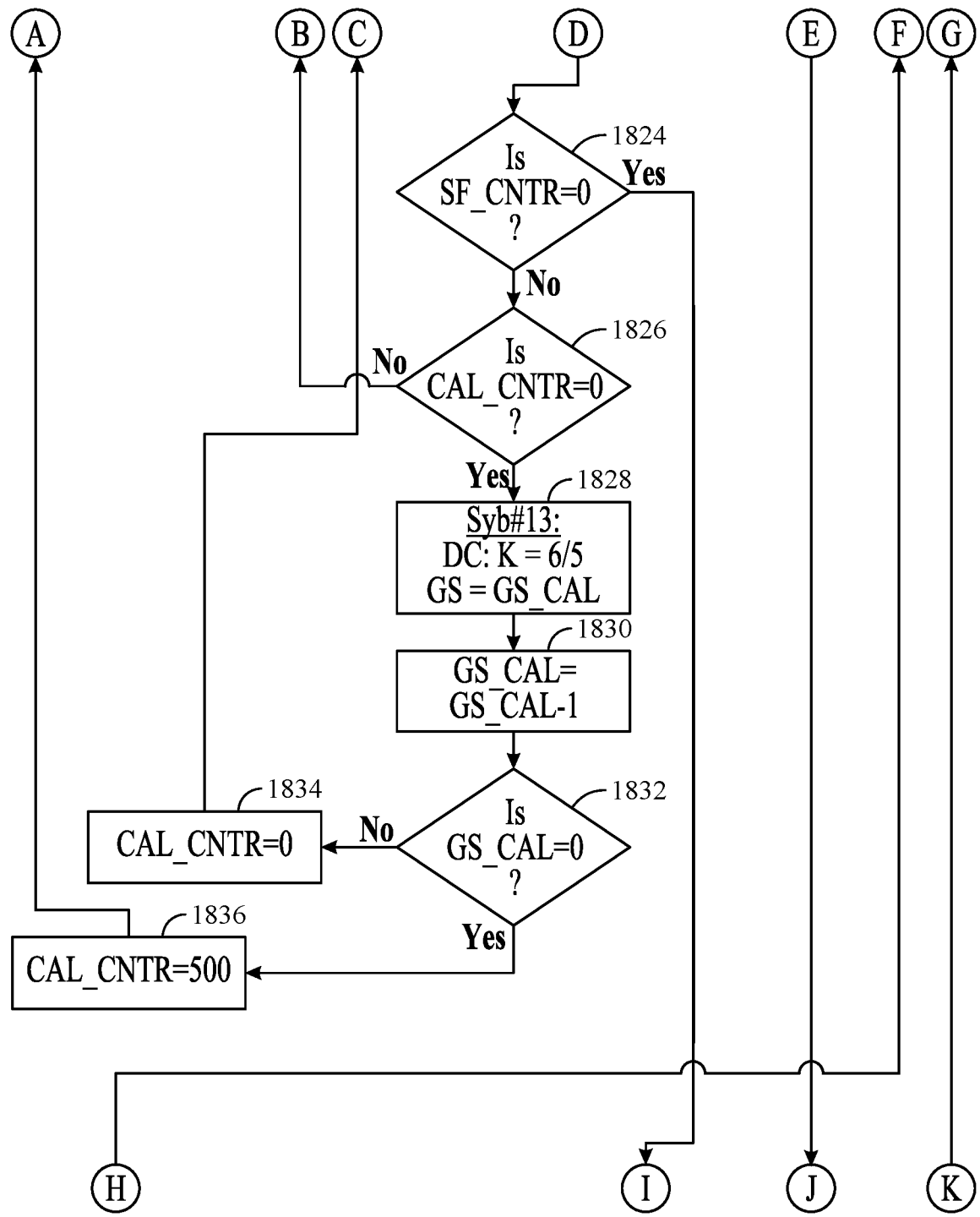
Figure 18:
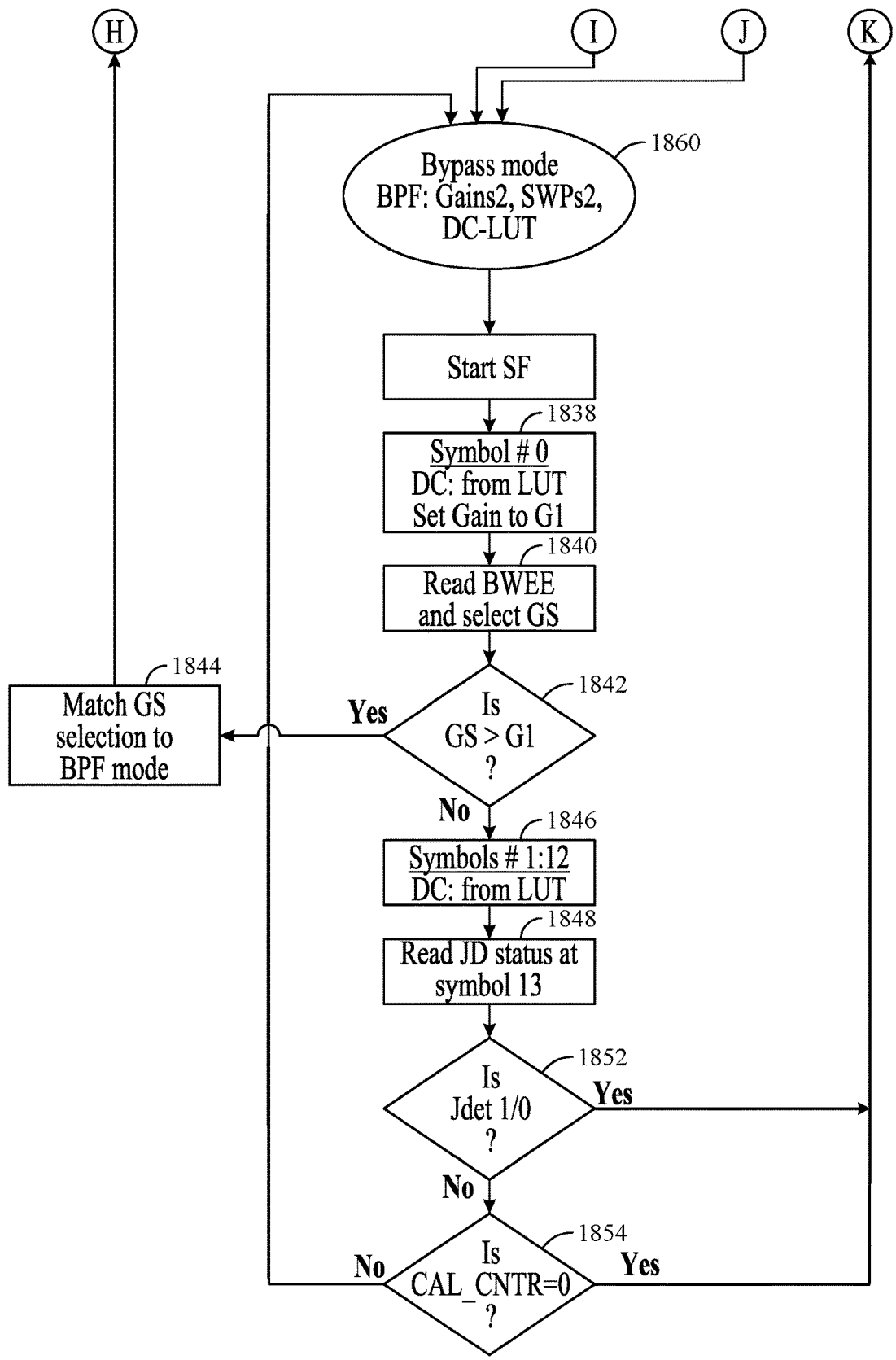

FIG. 18 illustrates a flowchart of a method 1800 for performing "fast" AGC for a receiver front-end (e.g., receiver front-end 1000), based on RF jamming signal detection and V2X signal detection, according to certain aspects of the present disclosure. The method 1800 may be controlled by a controller (e.g., controller 336).

Method 1800 may enter at block 1850, where the controller configures the receiver front-end to operate with a filter mode (e.g., BPF mode) in the RX path. As part of configuring the receiver front-end to operate with the filter mode in the RX path, the controller may set a DC calibration counter (CAL CNTR) to 1000 (or some other initial value), may set a subframe counter (SF_CNTR) to 2000 (or some other initial value), and may set a bypass counter (Bypass_SF) to 2000 (or some other initial value). The controller may also set an initial gain state calibration (GS_CAL) to an initial value (e.g., GS_CAL=7). When the receiver front-end is configured to operate with the filter mode, the controller may use a set of gains and switch points associated with the filter mode (e.g., table 700 illustrated in FIG. 7).

At block 1802, in symbol 0 of the subframe, the controller sets the DC correction value (K) to I/O and sets the gain to G1. At block 1804, in symbol 0 of the subframe, the controller reads the WBEE and selects a gain state from a set of gain states, based on the WBEE. The operations in block 1802 and block 1804 may be performed using the gain states illustrated in table 700 of FIG. 7. At block 1806, the controller sets the DC correction value (K) to 4/3 at a point in time during symbols 1 through 12 of the subframe.

At block 1808, during symbol 13 of the subframe, the controller performs a DC calibration. At block 1810, the controller updates a bypass counter (e.g., Bypass_SF=Bypass_SF-1). At block 1820, the controller determines whether the bypass counter is equal to 0. If the bypass counter is equal to 0, then the method proceeds to block 1822. If the bypass counter is not equal to 0, then the method proceeds to block 1824.

At block 1822, the controller determines whether the SFW-V2X bit is activated (e.g., SFW-V2X=1). If the SFW-V2X bit is not activated, then the method proceeds to block 1850. If the SFW-V2X bit is activated, then the method proceeds to block 1860, where the controller configures the receiver to operate with bypass mode in the RX path for the subsequent subframe.

At block 1824, the controller determines whether the subframe counter (SF_CNTR) is equal to 0. If the subframe counter is equal to 0, then the controller proceeds to block 1860. If the subframe counter is not equal to 0, then the controller determines whether the DC calibration counter (CAL CNTR) is equal to 0 (block 1826). If the DC calibration counter is not equal to 0, then the controller configures the receiver to continue operating with filter mode in the RX path for the subsequent subframe. On the other hand, if the DC calibration is equal to 0, then, during symbol 13 of the subframe, the controller updates the DC correction value (K) to 6/5 and sets the gain state selection to GS_CAL (block 1828). At block 1830, the controller updates GS_CAL (e.g., GS_CAL=GS_CAL-1).

At block 1832, the controller determines whether GS_CAL is equal to 0. If GS_CAL is not equal to 0, then the controller sets the DC calibration counter (CAL CNTR) to 0 (block 1834) and configures the receiver to continue operating with filter mode in the RX path for the subsequent subframe. If the controller determines GS_CAL is equal to 0, then the controller sets the DC calibration counter (CAL CNTR) to 500 (block 1836) and configures the receiver to continue operating with filter mode in the RX path for the subsequent subframe.

When the receiver front-end is configured to operate with the bypass mode (block 1860), the controller may use a set of gains and switch points associated with the bypass mode (e.g., table 1300 illustrated in FIG. 13). At block 1838, in symbol 0 of the subframe, the controller updates the DC correction value (K) based on the DC-LUT, and sets the gain to G1. At block 1840, in symbol 0 of the subframe, the controller reads the WBEE and selects a gain state from a set of gain states, based on the WBEE. The operations in block 1838 and block 1840 may be performed using the gain states illustrated in table 1300 of FIG. 13.

At block 1842, the controller determines whether the selected gain state is greater than G1. If so, then the controller matches the gain state selection to the filter mode (block 1844) and the method proceeds to block 1806. If the selected gain state is not greater than G1, then the controller updates the DC correction value based on the DC-LUT at a point in time during symbols 1 through 12 (block 1846).

At block 1848, the controller, in symbol 13, reads a status of the jamming detection circuitry. At block 1852, the controller determines whether the status of the jamming detection circuitry is "1" or "0". If the status of the jamming detection circuitry is "0," then the controller determines whether the calibration counter (CAL CNTR) is equal to 0 (block 1854). If the status of the jamming detection circuitry is "1," then the controller sets the subframe counter (SF_CNTR) to 2 and the bypass counter (Bypass SF) to 2 (block 1862) and configures the receiver to operate with filter mode in the RX path.

If, at block 1854, the calibration counter is equal to 0, then the method proceeds to block 1862. If, at block 1854, the calibration counter is not equal to 0, then the controller configures the receiver to continue operating in bypass mode for the subsequent subframe.

Example Operations

Figure 19:
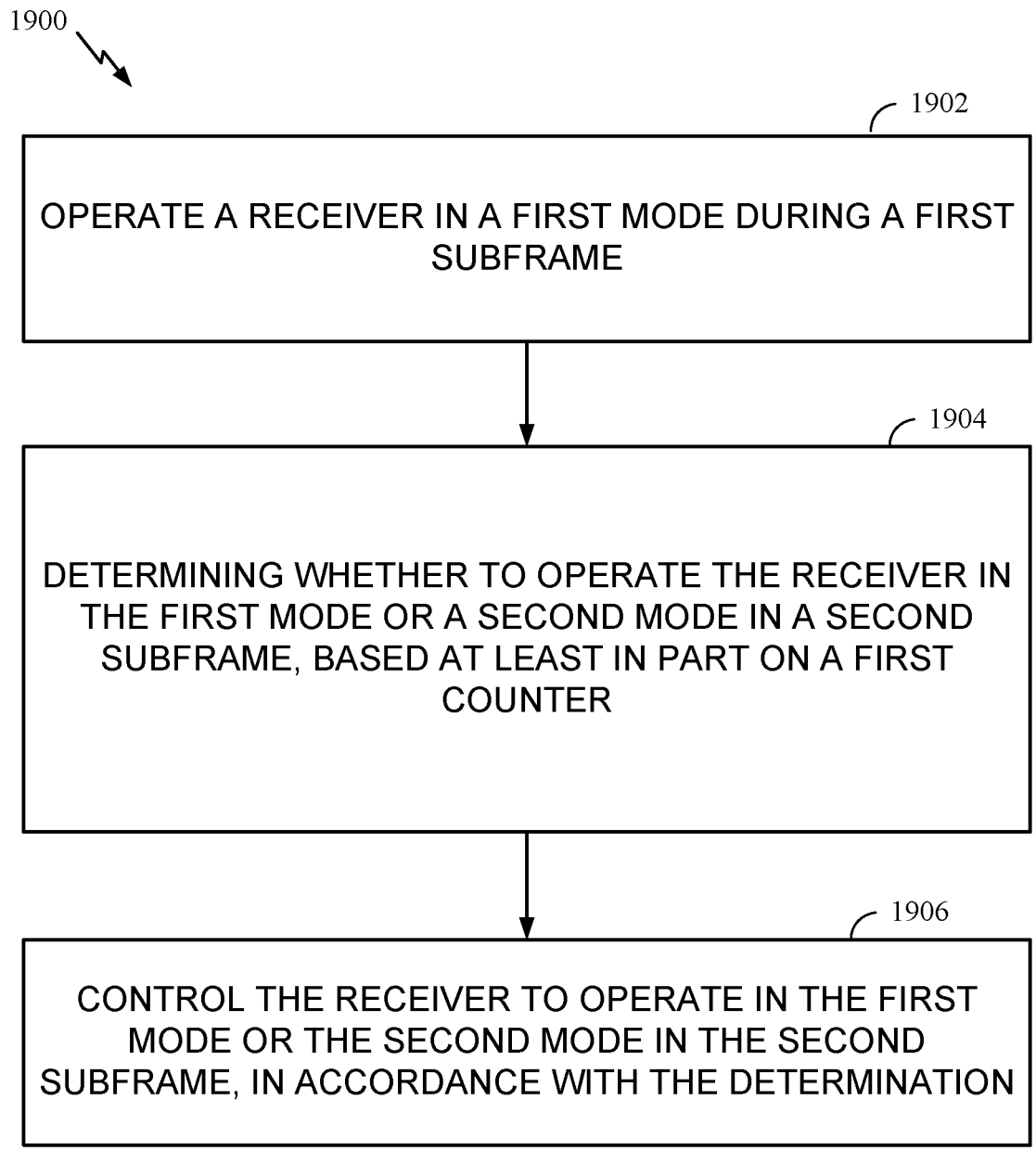
FIG. 19 is a flow diagram of example operations for operating a receiver in a filter mode and a bypass mode, in accordance with certain aspects of the present disclosure.

FIG. 19 is a flow diagram of example operations 1900 for operating a receiver (e.g., RX path 1004 of a receiver) in a filter mode and a bypass mode, in accordance with certain aspects of the present disclosure.

The operations 1900 may generally involve, at block 1902, operating a receiver (e.g., RX path 1004) in a first mode (e.g., filter mode) during a first subframe (e.g., subframe N−1).

The operations 1900 further involve, at block 1904, determining whether to operate the receiver in the first mode or a second mode (e.g., bypass mode) in a second subframe (e.g., subframe N), based at least in part on a first counter (e.g., SF_CNTR).

The operations 1900 further involve, at block 1906, controlling the receiver to operate in the first mode or the second mode in the second subframe, in accordance with the determination.

In one aspect, the operations 1900 further include performing a DC calibration in a first symbol (e.g., symbol 13) of the first subframe. The DC calibration may be performed based on at least one of: (i) a gain state selection or (ii) a second counter (e.g., DC calibration counter (CAL CNTR). For example, the controller may perform the DC calibration after performing a gain state selection (e.g., block 1808 of method 1800) and/or after the second counter has expired (e.g., block 1828 of method 1800).

In one aspect, the determination (in block 1904) is to operate the receiver in the second mode during the second subframe when the first counter is equal to a predetermined value (e.g., SF_CNTR=0). In one aspect, the determination (in block 1904) is to operate the receiver in the first mode during the second subframe when the first counter is not equal to the predetermined value (e.g., SF_CNTR !=0).

In one aspect, controlling the receiver (in block 1906) to operate in the first mode or the second mode includes operating the receiver in the second mode for at least a first set of symbols (e.g., symbols 1-12) of the second subframe.

In one aspect, the operations 1900 may further include, during a second symbol (e.g., symbol 13) of the second subframe outside of the first set of symbols of the second subframe, determining an output of a jamming detection circuit of the receiver in the second symbol. In this aspect, the operations 1900 may further include (i) determining to switch to operating the receiver in the first mode for a third subframe when the output of the jamming detection circuit indicates a jamming signal or (ii) determining to continue operating the receiver in the second mode for a third subframe when the output of the jamming detection circuit does not indicate a jamming signal.

Example Aspects

In addition to the various aspects described above, specific combinations of aspects are within the scope of the disclosure, some of which are detailed below:

Aspect 1: A method for wireless communication, the method comprising: operating a receiver in a first mode during a first set of symbols of a first subframe; during a first symbol of the first subframe outside the first set of symbols, determining whether to operate the receiver in the first mode or a second mode in a second subframe, based at least in part on an output of a jamming detection circuit of the receiver in the first symbol; and controlling the receiver to operate in the first mode or the second mode in the second subframe, in accordance with the determination.

Aspect 2: The method of Aspect 1, further comprising operating a transmitter, wherein the transmitter is configured to refrain from transmitting during the first symbol.

Aspect 3: The method of Aspect 1 or 2, wherein the first symbol is subsequent to the first set of symbols of the first subframe.

Aspect 4: The method of any of Aspects 1 to 3, wherein the receiver is configured to receive cellular vehicle-to-everything (C-V2X) reception signals.

Aspect 5: The method of any of Aspects 1 to 4, further comprising switching from operating the receiver in the first mode to operating the receiver in the second mode for a first portion of the first symbol, wherein the determination of whether to operate the receiver in the first mode or the second mode in the second subframe is based on the output of the jamming detection circuit in the first portion of the first symbol.

Aspect 6: The method of Aspect 5, wherein the determination is to operate the receiver in the first mode in the second subframe when the output of the jamming detection circuit indicates that a WiFi signal has been detected.

Aspect 7: The method of Aspect 5, wherein the determination is to operate the receiver in the first mode in the second subframe when the output of the jamming detection circuit indicates a detection of a jamming signal.

Aspect 8: The method of Aspect 7, wherein the detection of the jamming signal occurs in the first portion of the first symbol.

Aspect 9: The method of Aspect 7 or 8, wherein the jamming signal is an in-band signal caused by a third-order intermodulation product from at least two out-of-band signals.

Aspect 10: The method of any of Aspects 7 to 9, further comprising, after determining to operate the receiver in the first mode in the second subframe, determining to switch to operating the receiver in the second mode for a third subframe when the output of the jamming detection circuit indicating the detection of the jamming signal is caused by an in-band reception signal.

Aspect 11: The method of Aspect 10, wherein the in-band reception signal is a cellular vehicle-to-everything (C-V2X) reception signal.

Aspect 12: The method of any of Aspects 1 to 11, wherein the determination is to operate the receiver in the first mode in the second subframe when (i) the output of the jamming detection circuit indicates that a jamming signal has not been detected and (ii) a predetermined condition is not satisfied.

Aspect 13: The method of Aspect 12, wherein the predetermined condition comprises a number of subframes in which a jamming signal is not detected being greater than a threshold.

Aspect 14: The method of any of Aspects 1 to 11, wherein the determination is to operate the receiver in the second mode in the second subframe when (i) the output of the jamming detection circuit indicates that a jamming signal has not been detected and (ii) a predetermined condition is satisfied.

Aspect 15: The method of Aspect 14, wherein the predetermined condition comprises a number of subframes in which a jamming signal is not detected being greater than a threshold.

Aspect 16: The method of any of Aspects 1 to 5 and 14 to 15, wherein controlling the receiver to operate in the first mode or the second mode comprises operating the receiver in the second mode for at least a first symbol of the second subframe.

Aspect 17: The method of Aspect 16, further comprising: detecting an amount of energy of a reception signal during the first symbol of the second subframe; and selecting, from a plurality of gain states, a gain state for the reception signal, based on the amount of energy.

Aspect 18: The method of Aspect 17, further comprising, after the first symbol of the second subframe, switching from operating the receiver in the second mode to operating the receiver in the first mode when the selected gain state does not satisfy a predetermined condition.

Aspect 19: The method of Aspect 18, further comprising performing at least one of amplitude correction or phase correction upon switching from operating the receiver in the second mode to operating the receiver in the first mode.

Aspect 20: The method of Aspect 17, further comprising operating the receiver in the second mode for a first set of symbols, including the first symbol, of the second subframe, when the selected gain state satisfies a predetermined condition.

Aspect 21: The method of Aspect 20, further comprising: during a second symbol of the second subframe outside the first set of symbols of the second subframe, determining whether to operate the receiver in the first mode or the second mode in a third subframe, based at least in part on the output of the jamming detection circuit in the second symbol of the second subframe; and controlling the receiver to operate in the first mode or the second mode in the third subframe, in accordance with the determination during the second symbol of the second subframe.

Aspect 22: The method of Aspect 21, wherein the determination is to operate the receiver in the first mode in the third subframe when the output of the jamming detection circuit indicates detection of a jamming signal.

Aspect 23: The method of Aspect 22, wherein the detection of the jamming signal occurs in a symbol of the first set of symbols of the second subframe.

Aspect 24: The method of Aspect 21, wherein the determination is to operate the receiver in the second mode in the third subframe when the output of the jamming detection circuit indicates that a jamming signal has not been detected.

Aspect 25: The method of any of Aspects 1 to 24, wherein operating the receiver in the first mode comprises filtering a reception signal via a filter prior to amplifying the reception signal.

Aspect 26: The method of any of Aspects 1 to 25, wherein operating the receiver in the second mode comprises bypassing a filter prior to amplifying a reception signal.

Aspect 27: A method for wireless communication, the method comprising: operating a receiver in a first mode during a first subframe; determining whether to operate the receiver in the first mode or a second mode in a second subframe, based at least in part on a first counter; and controlling the receiver to operate in the first mode or the second mode in the second subframe, in accordance with the determination.

Aspect 28: The method of Aspect 27, further comprising performing a DC calibration in a first symbol of the first subframe.

Aspect 29: The method of Aspect 28, wherein the DC calibration is performed based on at least one of: (i) a gain state selection or (ii) a second counter.

Aspect 30: The method of any of Aspects 27 to 29, wherein the determination is to operate the receiver in the second mode during the second subframe when the first counter is equal to a predetermined value.

Aspect 31: The method of any of Aspects 27 to 29, wherein the determination is to operate the receiver in the first mode during the first subframe when the first counter is not equal to a predetermined value.

Aspect 32: The method of any of Aspects 27 to 30, wherein controlling the receiver to operate in the first mode or the second mode comprises operating the receiver in the second mode for at least a first set of symbols of the second subframe.

Aspect 33: The method of any of Aspects 27 to 30 and 32, further comprising, during a second symbol of the second subframe outside the first set of symbols of the second subframe, determining an output of a jamming detection circuit of the receiver in the second symbol.

Aspect 34: The method of Aspect 34, further comprising (i) determining to switch to operating the receiver in the first mode for a third subframe when the output of the jamming detection circuit indicates a jamming signal or (ii) determining to continue operating the receiver in the second mode for a third subframe when the output of the jamming detection circuit does not indicate a jamming signal.

Aspect 35: A wireless device comprising: a receiver comprising a jamming detection circuit; at least one processor coupled to the receiver; and a memory coupled to the at least one processor and storing computer-executable instructions, which, when executed by the at least one processor, perform a method in accordance with any of Aspects 1-34.

Aspect 36: An apparatus comprising means for performing a method in accordance with any of Aspects 1-34.

Aspect 37: A non-transitory computer-readable medium comprising executable instructions that, when executed by a processor of an apparatus, cause the apparatus to perform a method in accordance with any of Aspects 1-34.

Aspect 38: A computer program product embodied on a computer-readable storage medium comprising code for performing a method in accordance with any of Aspects 1-34.

Additional Considerations

The above description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components. For example, means for receiving a signal may include, for example, a receiver (e.g., receiver front-end 1000), an antenna(s) (e.g., antenna(s) 306), etc. Means for detecting a presence of a jamming signal may include, for example, a jamming detection circuit (e.g., jamming detection circuit 1102, jamming detection circuit 1106, logic gate 1104), etc. Means for determining and means for controlling may include, for example, one or more processors (e.g., controller 336, receive processor 258, etc.), etc.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for wireless communication, the method comprising:
   operating a receiver in a first mode during a first set of symbols of a first subframe;
   during a first symbol of the first subframe outside the first set of symbols, determining whether to operate the receiver in the first mode or a second mode in a second subframe, based at least in part on an output of a jamming detection circuit of the receiver in the first symbol; and
   controlling the receiver to operate in the first mode or the second mode in the second subframe, in accordance with the determination.

2. The method of claim 1, further comprising operating a transmitter, wherein the transmitter is configured to refrain from transmitting during the first symbol.

3. The method of claim 1, wherein the first symbol is subsequent to the first set of symbols of the first subframe.

4. The method of claim 1, wherein the receiver is configured to receive cellular vehicle-to-everything (C-V2X) reception signals.

5. The method of claim 1, further comprising switching from operating the receiver in the first mode to operating the receiver in the second mode for a first portion of the first symbol, wherein the determination of whether to operate the receiver in the first mode or the second mode in the second subframe is based on the output of the jamming detection circuit in the first portion of the first symbol.

6. The method of claim 5, wherein the determination is to operate the receiver in the first mode in the second subframe when the output of the jamming detection circuit indicates that a WiFi signal has been detected.

7. The method of claim 5, wherein the determination is to operate the receiver in the first mode in the second subframe when the output of the jamming detection circuit indicates a detection of a jamming signal.

8. The method of claim 7, wherein the detection of the jamming signal occurs in the first portion of the first symbol.

9. The method of claim 7, wherein the jamming signal is an in-band signal caused by a third-order intermodulation product from at least two out-of-band signals.

10. The method of claim 7, further comprising, after determining to operate the receiver in the first mode in the second subframe, determining to switch to operating the receiver in the second mode for a third subframe when the output of the jamming detection circuit indicating the detection of the jamming signal is caused by an in-band reception signal.

11. The method of claim 10, wherein the in-band reception signal is a cellular vehicle-to-everything (C-V2X) reception signal.

12. The method of claim 5, wherein the determination is to operate the receiver in the first mode in the second subframe when (i) the output of the jamming detection circuit indicates that a jamming signal has not been detected and (ii) a predetermined condition is not satisfied.

13. The method of claim 12, wherein the predetermined condition comprises a number of subframes in which a jamming signal is not detected being greater than a threshold.

14. The method of claim 5, wherein the determination is to operate the receiver in the second mode in the second subframe when (i) the output of the jamming detection circuit indicates that a jamming signal has not been detected and (ii) a predetermined condition is satisfied.

15. The method of claim 14, wherein the predetermined condition comprises a number of subframes in which a jamming signal is not detected being greater than a threshold.

16. The method of claim 1, wherein controlling the receiver to operate in the first mode or the second mode comprises operating the receiver in the second mode for at least a first symbol of the second subframe.

17. The method of claim 16, further comprising:
detecting an amount of energy of a reception signal during the first symbol of the second subframe; and
selecting, from a plurality of gain states, a gain state for the reception signal, based on the amount of energy.

18. The method of claim 17, further comprising, after the first symbol of the second subframe, switching from operating the receiver in the second mode to operating the receiver in the first mode when the selected gain state does not satisfy a predetermined condition.

19. The method of claim 18, further comprising performing at least one of amplitude correction or phase correction upon switching from operating the receiver in the second mode to operating the receiver in the first mode.

20. The method of claim 17, further comprising operating the receiver in the second mode for a first set of symbols, including the first symbol, of the second subframe, when the selected gain state satisfies a predetermined condition.

21. The method of claim 20, further comprising:
during a second symbol of the second subframe outside the first set of symbols of the second subframe, determining whether to operate the receiver in the first mode or the second mode in a third subframe, based at least in part on the output of the jamming detection circuit in the second symbol of the second subframe; and
controlling the receiver to operate in the first mode or the second mode in the third subframe, in accordance with the determination during the second symbol of the second subframe.

22. The method of claim 21, wherein the determination is to operate the receiver in the first mode in the third subframe when the output of the jamming detection circuit indicates detection of a jamming signal.

23. The method of claim 22, wherein the detection of the jamming signal occurs in a symbol of the first set of symbols of the second subframe.

24. The method of claim 21, wherein the determination is to operate the receiver in the second mode in the third subframe when the output of the jamming detection circuit indicates that a jamming signal has not been detected.

25. The method of claim 1, wherein operating the receiver in the first mode comprises filtering a reception signal via a filter prior to amplifying the reception signal.

26. The method of claim 1, wherein operating the receiver in the second mode comprises bypassing a filter prior to amplifying a reception signal.

27. A wireless device comprising:
a receiver comprising a jamming detection circuit;
at least one processor coupled to the receiver; and
a memory coupled to the at least one processor and storing computer-executable instructions, which, when executed by the at least one processor, perform an operation comprising:
operating the receiver in a first mode during a first set of symbols of a first subframe;
during a first symbol of the first subframe outside the first set of symbols, determining whether to operate the receiver in the first mode or a second mode in a second subframe, based at least in part on an output of the jamming detection circuit in the first symbol; and
controlling the receiver to operate in the first mode or the second mode in the second subframe, in accordance with the determination.

28. The wireless device of claim 27, wherein:
the receiver comprises a filter and an amplifier; and
controlling the receiver to operate in the first mode comprises controlling the receiver to filter a reception signal via the filter prior to amplifying the reception signal via the amplifier.

29. The wireless device of claim 27, wherein:
the receiver comprises a filter and an amplifier; and
controlling the receiver to operate in the second mode comprises controlling the receiver to have a reception signal bypass the filter prior to amplifying the reception signal via the amplifier.

30. An apparatus comprising:
means for receiving a signal in a first mode during a first set of symbols of a first subframe;
means for detecting a presence of a jamming signal during a first symbol of the first subframe outside the first set of symbols;
means for determining whether to operate the means for receiving in the first mode or a second mode in a second subframe, based at least in part on an output of the means for detecting in the first symbol; and
means for controlling the means for receiving to operate in the first mode or the second mode in the second subframe, in accordance with the determination.

* * * * *